(12) United States Patent
Brambilla et al.

(10) Patent No.: US 11,450,488 B2
(45) Date of Patent: Sep. 20, 2022

(54) COMPOSITE ELECTRODE

(71) Applicant: FastCAP SYSTEMS Corporation, Boston, MA (US)

(72) Inventors: Nicolò Michele Brambilla, Brookline, MA (US); Fabrizio Martini, Boston, MA (US); Daniel Rich, Cambridge, MA (US)

(73) Assignee: FASTCAP SYSTEMS CORPORATION, Boston, MA (US)

(*) Notice: Subject to any disclaimer, the term of this patent is extended or adjusted under 35 U.S.C. 154(b) by 0 days.

(21) Appl. No.: 16/427,546

(22) Filed: May 31, 2019

(65) Prior Publication Data
US 2019/0371534 A1 Dec. 5, 2019

Related U.S. Application Data

(63) Continuation-in-part of application No. PCT/US2017/064152, filed on Dec. 1, 2017.

(60) Provisional application No. 62/429,727, filed on Dec. 2, 2016.

(51) Int. Cl.
| | |
|---|---|
| *H01G 11/36* | (2013.01) |
| *H01G 11/28* | (2013.01) |
| *H01G 11/32* | (2013.01) |
| *H01M 4/64* | (2006.01) |

(52) U.S. Cl.
CPC ............ *H01G 11/36* (2013.01); *H01G 11/28* (2013.01); *H01G 11/32* (2013.01); *H01M 4/64* (2013.01)

(58) Field of Classification Search
CPC ........ H01G 11/36; H01G 11/32; H01G 11/40; H01G 11/68; H01G 11/70
See application file for complete search history.

(56) References Cited

U.S. PATENT DOCUMENTS

| | | | |
|---|---|---|---|
| 3,982,182 | A | 9/1976 | Hogg et al. |
| 4,349,910 | A | 9/1982 | Belz |
| 4,408,259 | A | 10/1983 | Muranaka et al. |
| 4,934,366 | A | 6/1990 | Truex et al. |
| 5,426,561 | A | 6/1995 | Yen et al. |
| 5,440,447 | A | 8/1995 | Shipman et al. |
| 5,441,827 | A | 8/1995 | Gratzel et al. |
| 5,476,709 | A | 12/1995 | Inoue et al. |
| 5,711,988 | A | 1/1998 | Tsai et al. |
| 5,905,629 | A | 5/1999 | Alford |

(Continued)

FOREIGN PATENT DOCUMENTS

| | | |
|---|---|---|
| CN | 101027736 A | 8/2007 |
| CN | 101794671 A | 8/2010 |

(Continued)

OTHER PUBLICATIONS

Du et al., High power density supercapacitor electrodes of carbon nanotube films by electrophoretic deposition, 2006, Nanotechnology, 17, pp. 5314-5318, (Year: 2006).*

(Continued)

*Primary Examiner* — Eric W Thomas

(57) ABSTRACT

An apparatus is disclosed that includes an active storage layer including: a network of carbon nanotubes defining void spaces; and a carbonaceous material located in the void spaces and bound by the network of carbon nanotubes. In some cases, the active layer provides energy storage, e.g., in an ultracapacitor device.

31 Claims, 8 Drawing Sheets

(56) References Cited

U.S. PATENT DOCUMENTS

| | | |
|---|---|---|
| 5,923,619 A | 7/1999 | Knapen et al. |
| 6,059,847 A | 5/2000 | Farahmandi et al. |
| 6,060,424 A | 5/2000 | Alford |
| 6,193,779 B1 | 2/2001 | Reichert et al. |
| 6,205,016 B1 | 3/2001 | Niu |
| 6,232,706 B1 | 5/2001 | Dai et al. |
| 6,257,332 B1 | 7/2001 | Vidrine et al. |
| 6,304,427 B1 | 10/2001 | Reed et al. |
| 6,318,457 B1 | 11/2001 | Den Boer et al. |
| 6,346,187 B1 | 2/2002 | Tran et al. |
| 6,350,488 B1 | 2/2002 | Lee et al. |
| 6,388,423 B1 | 5/2002 | Schilleci, Jr. |
| 6,413,285 B1 | 7/2002 | Chu et al. |
| 6,444,326 B1 | 9/2002 | Smith |
| 6,454,816 B1 | 9/2002 | Lee et al. |
| 6,491,848 B1 | 12/2002 | Sato et al. |
| 6,511,760 B1 | 1/2003 | Barone et al. |
| 6,514,113 B1 | 2/2003 | Lee et al. |
| 6,565,701 B1 | 5/2003 | Jerabek et al. |
| 6,665,169 B2 | 12/2003 | Tennent et al. |
| 6,764,874 B1 | 7/2004 | Zhang et al. |
| 6,843,119 B2 | 1/2005 | Patey et al. |
| 6,872,681 B2 | 3/2005 | Niu et al. |
| 6,906,911 B2 | 6/2005 | Ikeda et al. |
| 6,914,341 B1 | 7/2005 | McIntyre et al. |
| 6,924,059 B1 | 8/2005 | Kawakami et al. |
| 6,962,823 B2 | 11/2005 | Empedocles et al. |
| 7,070,833 B2 | 7/2006 | Smith et al. |
| 7,126,207 B2 | 10/2006 | Mosley et al. |
| 7,168,487 B2 | 1/2007 | Salamitou et al. |
| 7,201,627 B2 | 4/2007 | Ohnuma |
| 7,327,556 B2 | 2/2008 | Ro et al. |
| 7,335,395 B2 | 2/2008 | Ward et al. |
| 7,381,367 B1 | 6/2008 | Baker et al. |
| 7,468,679 B2 | 12/2008 | Feluch |
| 7,493,962 B2 | 2/2009 | Sheffield |
| 7,511,941 B1 | 3/2009 | Gallay et al. |
| 7,532,454 B2 | 5/2009 | Plee et al. |
| 7,699,102 B2 | 4/2010 | Storm et al. |
| 7,713,658 B2 | 5/2010 | Mizuta et al. |
| 7,767,114 B2 | 8/2010 | Gordon et al. |
| 7,785,558 B2 | 8/2010 | Hikata |
| 7,854,991 B2 | 12/2010 | Hata et al. |
| 7,897,209 B2 | 3/2011 | Shibuya et al. |
| 7,914,927 B2 | 3/2011 | Mizuta et al. |
| 7,982,439 B2 | 7/2011 | Trainor et al. |
| 7,999,695 B2 | 8/2011 | Rodney et al. |
| 8,025,971 B2 | 9/2011 | Maeno et al. |
| 8,119,032 B2 | 2/2012 | Gordon et al. |
| 8,168,331 B2 | 5/2012 | Best et al. |
| 8,481,158 B2 | 7/2013 | Nakayama et al. |
| 8,531,818 B2 | 9/2013 | Hashimoto et al. |
| 8,709,374 B2 | 4/2014 | Cooper et al. |
| 8,760,851 B2 | 6/2014 | Signorelli et al. |
| 8,817,452 B2 | 8/2014 | Nguyen et al. |
| 8,822,057 B2 | 9/2014 | Sinsabaugh et al. |
| 8,932,750 B2 | 1/2015 | Cooley et al. |
| 9,001,495 B2 | 4/2015 | Brambilla et al. |
| 9,013,144 B2 | 4/2015 | Cooley et al. |
| 9,017,634 B2 | 4/2015 | Brambilla et al. |
| 9,206,672 B2 | 12/2015 | Cooley et al. |
| 9,209,434 B2 | 12/2015 | Epstein |
| 9,214,709 B2 | 12/2015 | Cooley |
| 9,218,917 B2 | 12/2015 | Brambilla et al. |
| 9,455,094 B2 | 9/2016 | Tour et al. |
| 9,515,499 B2 | 12/2016 | Signorelli et al. |
| 9,558,894 B2 | 1/2017 | Signorelli et al. |
| 9,673,448 B2 | 6/2017 | Yushin et al. |
| 9,683,441 B2 | 6/2017 | Signorelli et al. |
| 9,954,382 B2 | 4/2018 | Cooley et al. |
| 10,340,520 B2 | 7/2019 | Yushin et al. |
| 10,600,582 B1 | 3/2020 | Brambilla et al. |
| 2001/0006108 A1 | 7/2001 | Brett |
| 2002/0043369 A1 | 4/2002 | Vinegar et al. |
| 2002/0159943 A1 | 10/2002 | Smalley et al. |
| 2002/0177018 A1 | 11/2002 | Fuglevand |
| 2003/0003359 A1 | 1/2003 | Banno et al. |
| 2003/0027038 A1 | 2/2003 | Tsukamoto et al. |
| 2003/0030969 A1 | 2/2003 | Farahmandi et al. |
| 2003/0081372 A1 | 5/2003 | Nakazawa et al. |
| 2004/0131937 A1 | 7/2004 | Chen et al. |
| 2004/0188350 A1 | 9/2004 | Beste et al. |
| 2004/0229117 A1 | 11/2004 | Mitani et al. |
| 2005/0152096 A1 | 7/2005 | Farahmandi et al. |
| 2005/0208207 A1 | 9/2005 | Hinoki et al. |
| 2005/0230270 A1 | 10/2005 | Ren et al. |
| 2005/0231893 A1 | 10/2005 | Harvey et al. |
| 2005/0234177 A1 | 10/2005 | Zaghib et al. |
| 2005/0238810 A1 | 10/2005 | Scaringe et al. |
| 2005/0250052 A1 | 11/2005 | Nguyen |
| 2006/0019168 A1 | 1/2006 | Li et al. |
| 2006/0115722 A1 | 6/2006 | Kim |
| 2006/0191681 A1 | 8/2006 | Storm et al. |
| 2006/0194102 A1 | 8/2006 | Keshishian et al. |
| 2006/0241236 A1 | 10/2006 | Kuznetsov et al. |
| 2006/0256506 A1 | 11/2006 | Konuma et al. |
| 2006/0279906 A1 | 12/2006 | Stemen et al. |
| 2007/0015336 A1 | 1/2007 | Farahmandi et al. |
| 2007/0076349 A1 | 4/2007 | Dementiev et al. |
| 2007/0097598 A1 | 5/2007 | Siggel et al. |
| 2007/0146965 A1 | 6/2007 | Mitchell et al. |
| 2007/0188977 A1 | 8/2007 | Takeda et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0292746 A1 | 12/2007 | Sloop |
| 2008/0013224 A1 | 1/2008 | Kim et al. |
| 2008/0068801 A1 | 3/2008 | Wilk |
| 2008/0083626 A1 | 4/2008 | Kubo et al. |
| 2008/0090183 A1 | 4/2008 | Zhu et al. |
| 2008/0094777 A1 | 4/2008 | Itahashi et al. |
| 2008/0192407 A1 | 8/2008 | Lu et al. |
| 2008/0218945 A1 | 9/2008 | Ro et al. |
| 2008/0304207 A1 | 12/2008 | Brandon et al. |
| 2008/0316678 A1 | 12/2008 | Ehrenberg et al. |
| 2008/0317660 A1 | 12/2008 | Pan et al. |
| 2009/0011330 A1 | 1/2009 | Onodera et al. |
| 2009/0021890 A1 | 1/2009 | Bourcier et al. |
| 2009/0154060 A1 | 6/2009 | Anderson et al. |
| 2009/0194314 A1 | 8/2009 | Varkey et al. |
| 2009/0246625 A1 | 10/2009 | Lu |
| 2009/0250409 A1 | 10/2009 | Fiene et al. |
| 2009/0272935 A1 | 11/2009 | Hata et al. |
| 2009/0272946 A1 | 11/2009 | Lu |
| 2009/0294753 A1 | 12/2009 | Hauge et al. |
| 2009/0303658 A1 | 12/2009 | Hiroyuki et al. |
| 2010/0039749 A1 | 2/2010 | Ritter et al. |
| 2010/0046142 A1 | 2/2010 | Aitchison et al. |
| 2010/0062229 A1 | 3/2010 | Hata et al. |
| 2010/0119934 A1 | 5/2010 | Ushio et al. |
| 2010/0134955 A1 | 6/2010 | O'Connor et al. |
| 2010/0178543 A1 | 7/2010 | Gruner et al. |
| 2010/0178564 A1 | 7/2010 | Asari et al. |
| 2010/0178568 A1 | 7/2010 | Unalan et al. |
| 2010/0195269 A1 | 8/2010 | Kim et al. |
| 2010/0196600 A1 | 8/2010 | Shibuya et al. |
| 2010/0196758 A1 | 8/2010 | Hojo et al. |
| 2010/0236777 A1 | 9/2010 | Partouche et al. |
| 2010/0259866 A1 | 10/2010 | Shaffer et al. |
| 2010/0282496 A1* | 11/2010 | Landi ............... H01M 4/587 174/133 R |
| 2011/0013344 A1 | 1/2011 | Remizov et al. |
| 2011/0027537 A1 | 2/2011 | Inoue et al. |
| 2011/0049901 A1 | 3/2011 | Tinnen et al. |
| 2011/0080689 A1 | 4/2011 | Bielawski et al. |
| 2011/0085285 A1 | 4/2011 | Zednizek et al. |
| 2011/0091767 A1 | 4/2011 | Hojo et al. |
| 2011/0102002 A1 | 5/2011 | Riehl et al. |
| 2011/0111279 A1 | 5/2011 | Smithyman et al. |
| 2011/0133284 A1 | 6/2011 | Mitra et al. |
| 2011/0141661 A1 | 6/2011 | Mutha et al. |
| 2011/0143197 A1 | 6/2011 | Ohtsuka et al. |
| 2011/0150736 A1 | 6/2011 | Hagiwara et al. |

(56) References Cited

U.S. PATENT DOCUMENTS

| | | |
|---|---|---|
| 2011/0151317 A1 | 6/2011 | Giroud et al. |
| 2011/0157773 A1 | 6/2011 | Sasaki |
| 2011/0170236 A1 | 7/2011 | Young |
| 2011/0170237 A1 | 7/2011 | Brandon et al. |
| 2011/0171371 A1 | 7/2011 | Li et al. |
| 2011/0183206 A1 | 7/2011 | Davis et al. |
| 2011/0220191 A1 | 9/2011 | Flood |
| 2011/0255212 A1 | 10/2011 | Liu et al. |
| 2011/0256454 A1 | 10/2011 | Nicolas et al. |
| 2011/0262772 A1 | 10/2011 | Hauge et al. |
| 2011/0281156 A1 | 11/2011 | Boren et al. |
| 2011/0293850 A1 | 12/2011 | Yi et al. |
| 2012/0021291 A1 | 1/2012 | Ji et al. |
| 2012/0094181 A1 | 4/2012 | Kim et al. |
| 2012/0099244 A1 | 4/2012 | Lee et al. |
| 2012/0122020 A1 | 5/2012 | Hata et al. |
| 2012/0154979 A1 | 6/2012 | Signorelli et al. |
| 2012/0231270 A1 | 9/2012 | Dhinojwala et al. |
| 2012/0251432 A1 | 10/2012 | Cooper et al. |
| 2012/0257326 A1 | 10/2012 | Gadkaree et al. |
| 2012/0313586 A1 | 12/2012 | Signorelli et al. |
| 2012/0313591 A1 | 12/2012 | Brambilla et al. |
| 2013/0004657 A1 | 1/2013 | Xu et al. |
| 2013/0005941 A1 | 1/2013 | Kondou et al. |
| 2013/0026978 A1 | 1/2013 | Cooley et al. |
| 2013/0029215 A1 | 1/2013 | Signorelli et al. |
| 2013/0033130 A1 | 2/2013 | Nair et al. |
| 2013/0044405 A1* | 2/2013 | Brambilla ............ H01G 11/36 361/502 |
| 2013/0045157 A1 | 2/2013 | Brambilla et al. |
| 2013/0141840 A1 | 6/2013 | Cooley et al. |
| 2013/0177812 A1 | 7/2013 | Han et al. |
| 2013/0189580 A1 | 7/2013 | Dai et al. |
| 2013/0222975 A1 | 8/2013 | Yan et al. |
| 2014/0016246 A1 | 1/2014 | Gadkaree et al. |
| 2014/0029161 A1 | 1/2014 | Beidaghi et al. |
| 2014/0042988 A1 | 2/2014 | Kuttipillai |
| 2014/0057164 A1 | 2/2014 | Brambilla et al. |
| 2014/0104754 A1 | 4/2014 | Lipka et al. |
| 2014/0106257 A1 | 4/2014 | Raychaudhuri et al. |
| 2014/0126112 A1 | 5/2014 | Nguyen et al. |
| 2014/0186550 A1 | 7/2014 | Cooper et al. |
| 2014/0265565 A1 | 9/2014 | Cooley et al. |
| 2014/0265580 A1 | 9/2014 | Cooley et al. |
| 2014/0299359 A1 | 10/2014 | Mittal et al. |
| 2014/0313636 A1 | 10/2014 | Tour et al. |
| 2014/0332731 A1 | 11/2014 | Ma et al. |
| 2014/0363568 A1 | 12/2014 | Suematsu et al. |
| 2015/0002987 A1 | 1/2015 | Signorelli et al. |
| 2015/0064092 A1 | 3/2015 | Noyes |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0279578 A1 | 10/2015 | Martini et al. |
| 2015/0287961 A1 | 10/2015 | Signorelli et al. |
| 2016/0012979 A1 | 1/2016 | Zheng |
| 2016/0104891 A1 | 4/2016 | Holme |
| 2016/0276111 A1 | 9/2016 | Kawaguchi et al. |
| 2017/0062831 A1 | 3/2017 | Predtechenskiy et al. |
| 2017/0316889 A1 | 11/2017 | Martini et al. |
| 2017/0338059 A1* | 11/2017 | Knopsnyder .......... H01G 11/18 |
| 2018/0068803 A1 | 3/2018 | Brambilla et al. |
| 2018/0068804 A1 | 3/2018 | Brambilla et al. |
| 2018/0112047 A1 | 4/2018 | Komukai et al. |
| 2018/0135408 A1 | 5/2018 | Cooley et al. |
| 2018/0171777 A1 | 6/2018 | Cooley et al. |
| 2018/0204689 A1 | 7/2018 | Brambilla |
| 2018/0211794 A1 | 7/2018 | Brambilla |
| 2018/0342358 A9 | 11/2018 | Brambilla |
| 2019/0058345 A1 | 2/2019 | Cooley et al. |
| 2019/0080854 A9 | 3/2019 | Brambilla |
| 2019/0218894 A9 | 7/2019 | Signorelli et al. |
| 2022/0077455 A1 | 3/2022 | Brambilla et al. |

FOREIGN PATENT DOCUMENTS

| | | |
|---|---|---|
| CN | 102306553 A | 1/2012 |
| CN | 103050294 A | 4/2013 |
| CN | 103891013 A | 6/2014 |
| CN | 103897183 A | 7/2014 |
| CN | 104362290 A | 2/2015 |
| CN | 105551823 A | 5/2016 |
| CN | 108950736 A | 12/2018 |
| EP | 1 798 743 A1 | 6/2007 |
| EP | 1953852 A1 | 8/2008 |
| EP | 2 056 212 A1 | 5/2009 |
| EP | 2081244 A1 | 7/2009 |
| FR | 2989821 A1 | 10/2013 |
| JP | 2003-133185 A | 5/2003 |
| JP | 2004-127737 A | 4/2004 |
| JP | 2005-183443 A | 7/2005 |
| JP | 2007-005718 A | 1/2007 |
| JP | 2007200979 A | 8/2007 |
| JP | 2009-076514 A | 4/2009 |
| JP | 2009-158961 A | 7/2009 |
| JP | 2009246306 A | 10/2009 |
| JP | 2010-087302 A | 4/2010 |
| JP | 2015229741 A | 12/2015 |
| WO | WO 99/66985 A | 12/1999 |
| WO | WO 00/19461 A1 | 4/2000 |
| WO | WO 00/44965 A1 | 8/2000 |
| WO | WO 2005/102924 A1 | 11/2005 |
| WO | WO 2006/011655 A1 | 2/2006 |
| WO | WO 2008/016990 A2 | 2/2008 |
| WO | 2008142913 A1 | 11/2008 |
| WO | WO 2009/125540 A1 | 10/2009 |
| WO | WO 2009/128343 A1 | 10/2009 |
| WO | WO 2010/067509 A1 | 6/2010 |
| WO | 2011117530 A1 | 9/2011 |
| WO | WO 2012/129690 A1 | 10/2012 |
| WO | WO 2012/162500 A2 | 11/2012 |
| WO | WO 2012/170749 A2 | 12/2012 |
| WO | WO 2013/119295 A1 | 8/2013 |
| WO | 2014192776 A1 | 12/2014 |
| WO | WO 2015/054432 A1 | 4/2015 |
| WO | WO 2015/102716 A2 | 7/2015 |
| WO | WO 2015/171528 A1 | 11/2015 |
| WO | WO 2018/102652 A1 | 6/2018 |
| WO | 2019143531 A1 | 7/2019 |

OTHER PUBLICATIONS

Smithyman et al., "Binder-free composite electrodes using carbon nanotube networks as a host matrix for activated carbon microparticles", Appl Phys A , (2012), 107:723-731 (Year: 2012).*
Xu et al., "Binder-Free Activated Carbon/Carbon Nanotube Paper Electrodes for Use in Supercapacitors", Nano Res. 2011, 4(9):870-881 (Year: 2011).*
U.S. Appl. No. 15/186,534, filed Jun. 19, 2016, Brambilla.
U.S. Appl. No. 15/482,765, filed Apr. 8, 2017, Brambilla et al.
EP 12796013.6, Mar. 24, 2015, Extended European Search Report.
PCT/US2012/041438, Nov. 19, 2012, International Search Report and Written Opinion.
PCT/US2012/041438, Dec. 27, 2013, International Preliminary Report on Patentability.
EP 14885660.2, Oct. 5, 2017, Extended European Search Report.
PCT/US2014/071998, Oct. 12, 2015, International Search Report and Written Opinion.
PCT/US2014/071998, Jun. 30, 2016, International Preliminary Report on Patentability.
EP 15849206.6, Jul. 4, 2018, Extended European Search Report.
PCT/US2015/055032, May 12, 2016, International Search Report and Written Opinion.
PCT/US2015/055032, Apr. 20, 2017, International Preliminary Report on Patentability.
PCT/US2017/064152, Mar. 22, 2018, International Search Report and Written Opinion.
PCT/US2017/064152, Jun. 13, 2019, International Preliminary Report on Patentability.
Office Action dated Dec. 11, 2013 for U.S. Appl. No. 12/928,897.

(56) References Cited

OTHER PUBLICATIONS

Office Action dated Jul. 16, 2014 for U.S. Appl. No. 12/928,897.
International Search Report and Written Opinion for PCT/US2012/039342 dated Dec. 6, 2012.
Extended European Search Report for EP 12796013.6 dated Mar. 24, 2015.
International Search Report and Written Opinion for PCT/US2012/041438 dated Nov. 19, 2012.
International Preliminary Report on Patentability for PCT/US2012/041438 dated Dec. 27, 2013.
International Search Report and Written Opinion for PCT/US12/45994 dated Dec. 26, 2012.
International Search Report and Written Opinion for PCT/US2012/047474 dated Oct. 16, 2012.
Office Action dated May 29, 2014 for U.S. Appl. No. 13/560,628.
Office Action dated Jun. 18, 2014 for U.S. Appl. No. 13/588,452.
Office Action dated Oct. 15, 2014 for U.S. Appl. No. 13/587,037.
International Search Report and Written Opinion for PCT/US2013/027697 dated Jun. 26, 2013.
International Search Report for PCT/US2014/029992 dated Oct. 7, 2014.
International Search Report PCT/US2014/030310 dated Oct. 10, 2014.
Extended European Search Report for EP App. No. 14885660.2 dated Oct. 5, 2017.
International Search Report and Written Opinion for PCT/US2014/071998 dated Oct. 12, 2015.
International Preliminary Report on Patentability for PCT/US2014/071998 dated Jun. 30, 2016.
Extended European Search Report for EP 15849206.6 dated Jul. 4, 2018.
International Search Report and Written Opinion for PCT/US2015/055032 dated May 12, 2016.
International Preliminary Report on Patentability for PCT/US2015/055032 dated Apr. 20, 2017.
International Search Report and Written Opinion for PCT/US2017/064152 dated Mar. 22, 2018.
International Preliminary Report on Patentability for PCT/US2017/064152 dated Jun. 13, 2019.
International Search Report and Written Opinion for PCT/US2007/068314 dated Feb. 13, 2008.
[No Author Listed], New high-energy cathode material can significantly increase safety, life of lithium batteries. ECOPRO—Battery Material Division. Apr. 7, 2009. 16 pages.
An, et al., "Electrochemical Properties Of High-Power Supercapacitors Using Single-Walled Carbon Nanotube Electrodes," Adv. Funct. Mater., Oct. 2001, 387-392, vol. 11, No. 5.
An, et al., "Supercapacitors Using Single-Walled Carbon Nanotube Electrodes", Advanced Materials, Apr. 2001, pp. 497-500, vol. 13, No. 7.
Awad, et al., "Thermal degradation studies of alkyl-imidazolium salts and their application in nanocomposites," Thermochimica Acta, pp. 3-11, 2004, vol. 409.
Balducci, et al., "High temperature carbon-carbon supercapacitor using ionic liquid as electrolyte," J. Power Sources, pp. 922-927, Jan. 3, 2007, vol. 165.
Chen et al., The nanocomposites of carbon nanotube with Sb and $SnSb_{0.5}$ as Li-ion battery anodes. Carbon. 2003;41(5):959-66. Epub Apr. 9, 2003.
Cui et al., Carbon-Silicon Core-Shell Nanowires as High Capacity Electrode for Lithium Ion Batteries. Nano Lett. 2009;9(9):3370-4. Epub Aug. 5, 2009.
Emmenegger, et al., "Investigation Of Electrochemical Double-layer {ECOL} Capacitors Electrodes Based On Carbon Nanotubes And Activated Carbon Materials," J. of Power Sources, 2003, pp. 321-329, vol. 124.
Evanoff et al., Towards Ultrathick Battery Electrodes: Aligned Carbon Nanotube—Enabled Architecture. Advanced Materials. Jan. 24, 2012;24(4):533-7.
Farmer et al., Atomic Layer Deposition on Suspended Single-Walled Carbon Nanotubes via Gas-Phase Noncovalent Functionalization. Nano Lett. 2006;6(4):699-703. Epub Mar. 4, 2006.
Farmer et al., The oxidation of alcohols in substituted imidazolium ionic liquids using ruthenium catalysts. Green Chemistry. 2002;4:97-102.
Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
Johnson et al., Thermocompression bonding of vertically aligned carbon nanotube turfs to metalized substrates. Nanotechnology. Jan. 15, 2009;20(6):065703. 6 pages.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007. 19 pages.
Kurtz et al., Chemical vapor deposition of titanium nitride at low temperatures. Thin Solid Films. Jul. 1, 1986;140(2):277-90.
Lee et al., High-power lithium batteries from functionalized carbon-nanotube electrodes. Nature Nanotechnology. 2010;5:531-7. Epub Jun. 20, 2010.
Liu, et al., "Graphene-Based Supercapacitor with an Ultrahigh Energy Density," Nano Lett., pp. 4863-4868, 2010, vol. 10.
Marincic, "High Temperature Electrochemical Double Layer Capacitors with Reduced Leakage Rate," 14th International Seminar on Double Layer Capacitors and Hybrid Energy Storage Devices, Dec. 6-8, 2004, pp. 310-316.
Maxwell Technologies Application Note, "Maxwell Technologies' Test Procedures for Capacitance, ESR, Leakage Current and Self-Discharge Characterizations of Ultracapacitors," Jul. 2009, pp. 1-10.
Maxwell Active Cell Voltage Management Electronics Document #1011130. Maxwell Technologies. Published Feb. 17, 2007. 9 pages.
Morris et al., High-energy, rechargeable Li-ion battery based on carbon nanotube technology. Journal of Power Sources. Nov. 15, 2004;138(1-2):277-80.
Murakami, et al., "Growth Of Vertically Aligned Single-walled Carbon Nanotube Films On Quartz Substrates And Their Optical Anisotropy," Chem. Phys. Lett., 2004, pp. 298-303, vol. 385.
Ng et al., Single wall carbon nanotube paper as anode for lithium-ion battery. Electrochimica Acta. Oct. 5, 2005;51(1):23-8.
Ngo, et al., "Thermal properties of imidazolium ionic liquids," Thermochimica Acta, pp. 97-102, 2000, vol. 357-58.
Nishida, et al., "Physical and electrochemical properties of 1-alkyl-3-methylimidazolium tetrafluoroborate for electrolyte," J. Fluorine Chem., pp. 135-141, 2003, vol. 120.
Niu, et al., "High Power Electrochemical Capacitors Based On Carbon Nanotube Electrodes," Appl. Phys. Lett., Mar. 17, 1997, pp. 1480-1482, vol. 70, No. 11.
Randstrom, "The influence of air and its components on the cathodic stability of N-butyl-N-methylpyrrolidinium bis (trifluoromethanesulfonyl)imide," Electrochimica Acta, pp. 1837-1842, Aug. 19, 2007, vol. 53.
Robertson, "Realistic applications of CNTs," materials today, Oct. 2004, pp. 46-52, vol. 7, No. 10.
Schneuwly, et al. "Properties of supercapacitors From the state-of-the-art to future trends" Proc. PCIM 2000. 9 pages.
Shamsipur, et al., "Physical and electrochemical properties of ionic liquids 1-ethyl-3-methylimidazolium tetrafluoroborate, 1-butyl-3-methylimidazolium trifluoromethanesulfonate and 1-butyl-1-methylpyrrolidinium bis (trifluoromethylsulfonyl)imide," J. Mol. Liq., pp. 43-50, Aug. 24, 2010, vol. 157.
Signorelli, et al., "Carbon Nanotube Enhanced Ultracapacitor", Sep. 2004. 2 pages.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.

(56) References Cited

OTHER PUBLICATIONS

Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.

Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.

Signorelli, et al., "Nanotube Enhanced Ultracapacitor," 14th International Seminar on Double Layer Capacitors and Hybrid Energy Storage Devices, Dec. 6-8, 2004, pp. 49-61.

Signorelli, et al., "Nanotube Enhanced Ultracapacitor," 15th International Seminar on Double Layer Capacitors and Hybrid Energy Storage Devices, Dec. 5-7, 2005, pp. 158-168.

Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.

Welna et al., Vertically aligned carbon nanotube electrodes for lithium-ion batteries. Journal of Power Sources. Feb. 1, 2011;196(3):1455-60.

Wongwiriyapan, et al., "Direct Growth of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.

Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.

Mikhalin, Issledovanie emkostnyk i elektrokineticheskikh svoistv elektrodov na osnove vysokodispersnogo ugleroda priminitelno k ikh ispolzovaniyu v superkondensatorakh i dlya emkostnoi dionizatsii vody. Dissertatsiya na soiskanie uchenoi stepeni kandidata khimicheskikh nauk. Moskva. 2013;1:36-43.

Extended European Search Report for EP Application No. 17876365.2; dated Jun. 25, 2020 (8 pages).

Foygel et al.; "Theoretical and computational studies of carbon nanotube composites and suspensions: Electrical and thermal conductivity"; Physical Review B 71; Mar. 2005; 8 pages.

International Search Report and Written Opinion for International Application No. PCT/US2020/040943; International Filing date Jul. 6, 2020; dated Oct. 1, 2020; 8 pages.

Li et al.; "Progress in electrolytes for rechargeable Li-based batteries and beyond"; Green Energy & Environment 1; Feb. 2016; 18-42.

* cited by examiner

COMPOSITE ELECTRODE

RELATED APPLICATIONS

The present application is a continuation-in-part of International Patent Application No. PCT/US2017/064152, filed Dec. 1, 2017 and entitled "Composite Electrode," which claims the benefit of U.S. Provisional Application No. 62/429,727 entitled "Composite Electrode" and filed Dec. 2, 2016, each of which is incorporated herein by reference in its entirety for all purposes.

BACKGROUND

Carbon nanotubes (hereinafter referred to also as "CNTs") are carbon structures that exhibit a variety of properties. Many of the properties suggest opportunities for improvements in a variety of technology areas. These technology areas include electronic device materials, optical materials as well as conducting and other materials. For example, CNTs are proving to be useful for energy storage in capacitors.

However, CNTs are typically expensive to produce and may present special challenges during electrode manufacturing. Accordingly, there is a need for an electrode material that exhibits the advantageous properties of CNTs while mitigating the amount of CNTs included in the material.

SUMMARY

The applicants have developed a composite electrode structure that exhibits advantageous properties. In some embodiments, the electrode exhibits the advantageous properties of CNTs while mitigating the amount of CNTs included in the material, e.g., to less than 10% by weight.

Electrodes of the type described herein may be used in ultracapacitors to provide high performance (e.g., high operating, voltage, high operating temperature, high energy density, high power density, low equivalent series resistance, etc.).

In one aspect, an apparatus is disclosed including an active storage layer including a network of carbon nanotubes defining void spaces; and a carbonaceous material located in the void spaces and bound by the network of carbon nanotubes, wherein the active layer is configured to provide energy storage.

In some embodiments, the active layer is substantially free from binding agents. In some embodiments, the active layer consists of or consists essentially of carbonaceous material. In some embodiments, the active layer is bound together by electrostatic forces between the carbon nanotubes and the carbonaceous material. In some embodiments, the carbonaceous material includes activated carbon.

In some embodiments, the carbonaceous material includes nanoform carbon other than carbon nanotubes.

In some embodiments, the network of carbon nanotubes makes up less than 50% by weight of the active layer, less than 15% by weight of the active layer, less than 10% by weight of the active layer, less than 5% by weight of the active layer, or less than 1% by weight of the active layer.

Some embodiments include an adhesion layer, e.g., a layer consisting of or consisting essentially of carbon nanotubes. In some embodiments the adhesion layer is disposed between the active layer and an electrically conductive layer.

In some embodiments, a surface of the conductive layer facing the adhesion layer includes a roughened or textured portion. In some embodiments, a surface of the conductive layer facing the adhesion layer includes a nanostructured portion. In some embodiments, the nanostructured portion includes carbide "nanowhiskers." These nanowhiskers are thin elongated structures (e.g., nanorods) that extend generally away from the surface of the conductor layer 102. The nanowhiskers may have a radial thickness of less than 100 nm, 50 nm, 25 nm, 10 nm, or less, e.g., in the range of 1 nm to 100 nm or any subrange thereof. The nanowhisker may have a longitudinal length that is several to many times its radial thickness, e.g., greater than 20 nm, 50 nm, 100 nm, 200 nm, 300 nm, 400 nm, 500 nm, 1 µm, 5 µm, 10 µm, or more, e.g., in the range of 20 nm to 100 µm or any subrange thereof.

In some embodiments, the active layer has been annealed to reduce the presence of impurities.

In some embodiments, active layer has been compressed to deform at least a portion of the network of carbon nanotubes and carbonaceous material.

Some embodiments include an electrode including the active layer. In some embodiments, the electrode is a two-sided electrode comprising a second active layer. Some embodiments include an ultracapacitor including the electrode. In some embodiments, the ultracapacitor has an operating voltage greater than 1.0 V, 2.0 V, 2.5 V, 3.0 V, 3.1 V, 3.2 V, 3.5 V, 4.0 V, or more.

In some embodiments, the ultracapacitor has a maximum operating temperature of at least 250° C. at an operating voltage of at least 1.0 V for a lifetime of at least 1,000 hours. In some embodiments, the ultracapacitor has a maximum operating temperature of at least 250° C. at an operating voltage of at least 2.0 V for a lifetime of at least 1,000 hours. In some embodiments, the ultracapacitor has a maximum operating temperature of at least 250° C. at an operating voltage of at least 3.0 V for a lifetime of at least 1,000 hours. In some embodiments, the ultracapacitor has a maximum operating temperature of at least 250° C. at an operating voltage of at least 4.0 V for a lifetime of at least 1,000 hours. In some embodiments, the ultracapacitor has a maximum operating temperature of at least 300° C. at an operating voltage of at least 1.0 V for a lifetime of at least 1,000 hours. In some embodiments, the ultracapacitor has a maximum operating temperature of at least 300° C. at an operating voltage of at least 2.0 V for a lifetime of at least 1,000 hours. In some embodiments, the ultracapacitor has a maximum operating temperature of at least 300° C. at an operating voltage of at least 3.0 V for a lifetime of at least 1,000 hours. In some embodiments, the ultracapacitor has a maximum operating temperature of at least 300° C. at an operating voltage of at least 4.0 V for a lifetime of at least 1,000 hours.

In another aspect, a method includes: dispersing carbon nanotubes in a solvent to form a dispersion; mixing the dispersion with carbonaceous material to form a slurry; applying the slurry in a layer; and drying the slurry to substantially remove the solvent to form an active layer including a network of carbon nanotubes defining void spaces and a carbonaceous material located in the void spaces and bound by the network of carbon nanotubes. Some embodiments include forming and/or applying a layer of carbon nanotubes to provide an adhesion layer on a conductive layer.

In some embodiments, the applying step comprises applying the slurry onto the adhesion layer.

Various embodiments may include any of the forgoing elements or features, or any elements or features described herein either alone or in any suitable combination.

DETAILED DESCRIPTION

Figure 1:
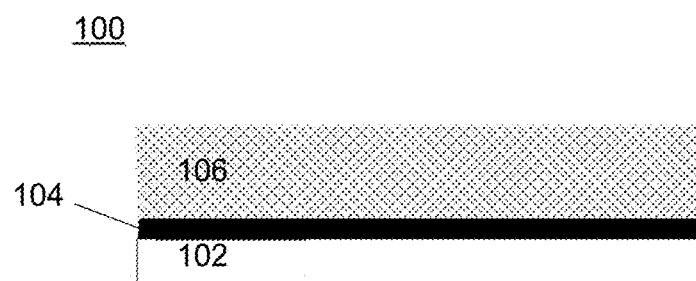
FIG. 1 is a schematic of an electrode.

Referring to FIG. 1, an exemplary embodiment of an electrode 100 is disclosed for use in an energy storage device, such as an ultracapacitor or battery. The electrode includes an electrically conductive layer 102 (also referred to herein as a current collector), an adhesion layer 104, and an active layer 106. When used in an ultracapacitor of the type described herein, the active layer 106 may act as energy storage media, for example, by providing a surface interface with an electrolyte (not shown) for formation of an electric double layer (sometimes referred to in the art as a Helmholtz layer). In some embodiments, the adhesion layer 104 may be omitted, e.g., in cases where the active layer 106 exhibits good adhesion to the electrically conductive layer 102.

In some embodiments, the active layer 106 may be thicker than the adhesion layer 104, e.g., 1.5, 2.0, 5.0, 10, 20, 30, 40, 50, 60, 70, 80, 90, 100, 500, 1,000, or more times the thickness of the adhesion layer 104. For example, in some embodiments, the thickness of the active layer 106 may be in the range of 1.5 to 1,000 times the thickness of the adhesion layer 104 (or any subrange thereof, such as 5 to 100 times). For example, in some embodiments the active layer 106 may have a thickness in the range of 0.5 to 2500 µm or any subrange thereof, e.g., 5 µm to 150 µm. In some embodiments the adhesion layer 104 may have a thickness in the range of 0.5 µm to 50 µm or any subrange thereof, e.g., 1 µm to 5 µm.

Figure 2:
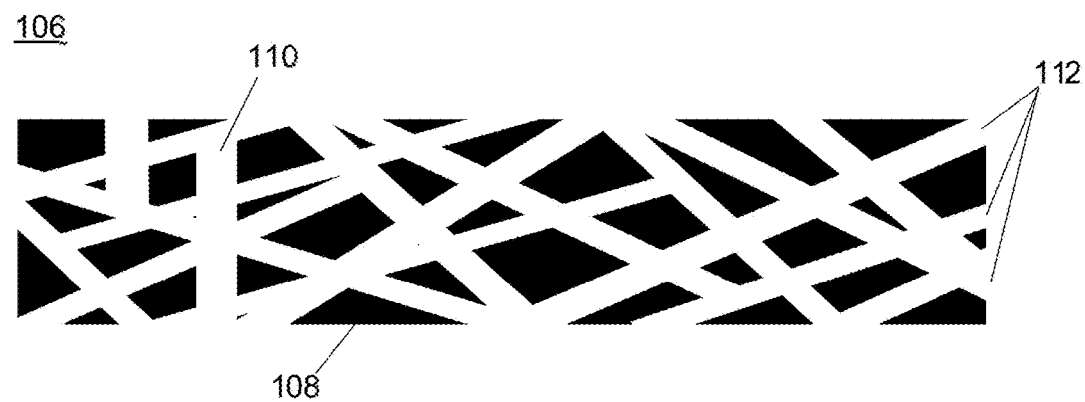
FIG. 2 is an illustration of a detailed view of an active layer of an electrode.

Referring to FIG. 2, in some embodiments, the active layer 106 is comprised of carbonaceous material 108 (e.g., activated carbon) bound together by a matrix 110 of CNTs 112 (e.g., a webbing or network formed of CNTs). In some embodiments, e.g., where the length of the CNTs is longer than the thickness of the active layer 106, the CNTs 112 forming the matrix 110 may lie primarily parallel to a major surface of the active layer 106. Note that although as shown the CNTs 112 form straight segments, in some embodiments, e.g., where longer CNTs are used, the some or all of the CNTs may instead have a curved or serpentine shape. For example, in cases where the carbonaceous material 108 includes lumps of activated carbon, the CNTs 112 may curve and wind between the lumps.

In some embodiments, the active layer is substantially free of any other binder material, such as polymer materials, adhesives, or the like. In other words, in such embodiments, the active layer is substantially free from any material other than carbon. For example, in some embodiments, the active layer may be at least about 90 wt %, 95 wt %, 96 wt %, 97 wt %, 98 wt %, 99 wt %, 99.5 wt %, 99.9 wt %, 99.99 wt %, 99.999 wt %, or more elemental carbon by mass. Despite this, the matrix 110 operates to bind together the carbonaceous material 108, e.g., to maintain the structural integrity of the active layer 106 without flaking, delamination, disintegration, or the like.

It has been found that use of an active layer substantially free of any non-carbon impurities substantially increases the performance of the active layer in the presence of high voltage differentials, high temperatures, or both. Not wishing to be bound by theory, it is believed that the lack of impurities prevents the occurrence of unwanted chemical side reactions which otherwise would be promoted in high temperature or high voltage conditions.

As noted above, in some embodiments, the matrix 110 of carbon nanotubes provides a structural framework for the active layer 106, with the carbonaceous material 108 filling the spaces between the CNTs 112 of the matrix 110. In some embodiments, electrostatic forces (e.g., Van Der Waals forces) between the CNTs 112 within the matrix 110 and the other carbonaceous material 108 may provide substantially all of the binding forces maintaining the structural integrity of the layer.

In some embodiments, the CNTs 112 may include single wall nanotubes (SWNT), double wall nanotubes (DWNT), or multiwall nanotubes (MWNT), or mixtures thereof. Although a matrix 110 of individual CNTs 112 is shown, in some embodiments, the matrix may include interconnected bundles, clusters or aggregates of CNTs. For example, in some embodiments where the CNTs are initially formed as vertically aligned, the matrix may be made up at least in part of brush like bundles of aligned CNTs.

In order to provide some context for the teachings herein, reference is first made to U.S. Pat. No. 7,897,209, entitled "Apparatus and Method for Producing Aligned Carbon Nanotube Aggregate." The foregoing patent (the "'209 patent") teaches a process for producing aligned carbon nanotube aggregate. Accordingly, the teachings of the '209 patent, which are but one example of techniques for producing CNTs in the form of an aligned carbon nanotube aggregate, may be used to harvest CNTs referred to herein. Advantageously, the teachings of the '209 patent may be used to obtain long CNTs having high purity. In other embodiments, any other suitable method known in the art for producing CNTs may be used.

In some embodiments the active layer 106 may be formed as follows. A first solution (also referred to herein as a "slurry") is provided that includes a solvent and a dispersion of carbon nanotubes, e.g., vertically aligned carbon nanotubes. A second solution (also referred to herein as a "slurry") may be provided that includes a solvent with carbon disposed therein. This carbon addition includes at least one form of material that is substantially composed of carbon. Exemplary forms of the carbon addition include, for example, at least one of activated carbon, carbon powder, carbon fibers, rayon, graphene, aerogel, nanohorns, carbon nanotubes, and the like. While in some embodiments, the carbon addition is formed substantially of carbon, it is recognized that in alternative embodiments the carbon addition may include at least some impurities, e.g., additives included by design.

In some embodiments, forming the first and/or second solution include introducing mechanical energy into the mixture of solvent and carbon material, e.g., using a sonicator (sometimes referred to as a "sonifier") or other suitable mixing device (e.g., a high shear mixer). In some embodiments, the mechanical energy introduced into the mixture per kilogram of mixture is at least 0.4 kWh/kg, 0.5 kWh/kg, 0.6 kWh/kg, 0.7 kWh/kg, 0.8 kWh/kg, 0.9 kWh/kg, 1.0 kWh/kg, or more. For example, the mechanical energy introduced into the mixture per kilogram of mixture may be in the range of 0.4 kWh/kg to 1.0 kWh/kg or any subrange thereof such as 0.4 kWh/kg to 0.6 kWh/kg.

In some embodiments, the solvents used may include an anhydrous solvent. For example, the solvent may include at least one of ethanol, methanol, isopropyl alcohol, dimethyl sulfoxide, dimethylformamide, acetone, acetonitrile, and the like.

As noted above, the two solutions may be subjected to "sonication" (physical effects realized in an ultrasonic field). With regard to the first solution, the sonication is generally conducted for a period that is adequate to tease out, fluff, or otherwise parse the carbon nanotubes. With regard to the second solution, the sonication is generally conducted for a period that is adequate to ensure good dispersion or mixing of the carbon additions within the solvent. In some embodiments, other techniques for imparting mechanical energy to the mixtures may be used in addition or alternative to sonication, e.g., physical mixing using stirring or impeller.

Once one or both of the first solution and the second solution have been adequately sonicated, they are then mixed together, to provide a combined solution and may again be sonicated. Generally, the combined mixture is sonicated for a period that is adequate to ensure good mixing of the carbon nanotubes with the carbon addition. This second mixing (followed by suitable application and drying steps as described below) results in the formation of the active layer 106 containing the matrix 110 of CNTs 112, with the carbon addition providing the other carbonaceous material 108 filling the void spaces of the matrix 110.

In some embodiments, mechanical energy may be introduced to the combined mixture using a sonicator (sometimes referred to as a sonifier) or other suitable mixing device (e.g., a high shear mixer). In some embodiments, the mechanical energy into the mixture per kilogram of mixture is at least 0.4 kWh/kg, 0.5 kWh/kg, 0.6 kWh/kg, 0.7 kWh/kg, 0.8 kWh/kg, 0.9 kWh/kg, 1.0 kWh/kg, or more. For example, the mechanical energy introduced into the mixture per kilogram of mixture may be in the range of 0.4 kWh/kg to 1.0 kWh/kg or any subrange thereof such as 0.4 kWh/kg to 0.6 kWh/kg.

In some embodiments, the combined slurry may be cast wet directly onto the adhesion layer 104 or the conductive layer 102, and dried (e.g., by applying heat or vacuum or both) until substantially all of the solvent and any other liquids have been removed, thereby forming the active layer 106. In some such embodiments it may be desirable to protect various parts of the underlying layers (e.g., an underside of a conductive layer 102 where the current collector is intended for two sided operation) from the solvent, e.g., by masking certain areas, or providing a drain to direct the solvent.

In other embodiments, the combined slurry may be dried elsewhere and then transferred onto the adhesion layer 104 or the conductive layer 102 to form the active layer 106, using any suitable technique (e.g., roll-to-roll layer application). In some embodiments the wet combined slurry may be placed onto an appropriate surface and dried to form the active layer 106. While any material deemed appropriate may be used for the surface, exemplary material includes PTFE as subsequent removal from the surface is facilitated by the properties thereof. In some embodiments, the active layer 106 is formed in a press to provide a layer that exhibits a desired thickness, area and density.

In some embodiments, the average length of the CNTs 112 forming the matrix 110 may be at least 0.1 µm, 0.5 µm, 1 µm, 5 µm, 10 µm, 50 µm, 100 µm, 200 µm, 300 µm, 400 µm, 500 µm, 600 µm, 7000 µm, 800 µm, 900 µm, 1,000 µm or more. For example, in some embodiments, the average length of the CNTs 112 forming the matrix 110 may be in the range of 1 µm to 1,000 µm, or any subrange thereof, such as 1 µm to 600 µm. In some embodiments, more than 50%, 60%, 70%, 80%, 90%, 95%, 99% or more of the CNTs 112 may have a length within 10% of the average length of the CNTs 112 making up the matrix 110.

In various embodiments, the other carbonaceous material 108 can include carbon in a variety forms, including activated carbon, carbon black, graphite, and others. The carbonaceous material can include carbon particles, including nanoparticles, such as nanotubes, nanorods, graphene in sheet, flake, or curved flake form, and/or formed into cones, rods, spheres (buckyballs) and the like.

Applicants have found an unexpected result that an active layer of the type herein can provide superior performance (e.g., high conductivity, low resistance, high voltage performance, and high energy and power density) even when the mass fraction of CNTs in the layer is quite low. For example, in some embodiments, the active layer may be at least about 50 wt %, 60 wt %, 70 wt %, 75 wt %, 80 wt %, 85 wt %, 90 wt %, 95 wt %, 96 wt % 97 wt %, 98 wt %, 99 wt %, 99.5 wt %, or more elemental carbon in a form other than CNT (e.g., activated carbon). In particular, for certain applications involving high performance ultracapacitors, active layers 106 that are in the range of 95 wt % to 99 wt % activated carbon (with the balance CNTs 112), have been shown to exhibit excellent performance.

In some embodiments, the matrix 110 of CNTs 112 form an interconnected network of highly electrically conductive paths for current flow (e.g. ion transport) through the active layer 106. For example, in some embodiments, highly conductive junctions may occur at points where CNTs 112 of the matrix 110 intersect with each other, or where they are in close enough proximity to allow for quantum tunneling of charge carriers (e.g., ions) from one CNT to the next. While the CNTs 112 may make up a relatively low mass fraction of the active layer (e.g., less than 10 wt %, 5 wt %, 4 wt %, 3 wt %, 2 wt %, 1 wt %, or less, e.g., in the range of 0.5 wt % to 10 wt % or any subrange thereof such as 1 wt % to 5.0 wt %), the interconnected network of highly electrically conductive paths formed in the matrix 110 may provide long conductive paths to facilitate current flow within and through the active layer 106 (e.g. conductive paths on the order of the thickness of the active layer 106).

For example, in some embodiments, the matrix 110 may include one or more structures of interconnected CNTs, where the structure has an overall length in along one or more dimensions longer than 2, 3, 4, 5, 10, 20, 50, 100, 500, 1,000, 10,000, or more times the average length of the component CNTs making up the structure. For example, in some embodiments, the matrix 110 may include one or more structures of interconnected CNTs, where the structure has an overall in the range of 2 to 10,000 (or any subrange thereof) times the average length of the component CNTs making up the structure For example, in some embodiments the matrix 110 may include highly conductive pathways having a length greater than 100 µm, 500 µm, 1,000 µm, 10,000 µm, or more, e.g., in the range of 100 µm-10,000 µm of any subrange thereof.

As used herein, the term "highly conductive pathway" is to be understood as a pathway formed by interconnected CNTs having an electrical conductivity higher than the electrical conductivity of the other carbonaceous material 108 (e.g., activated carbon), surrounding that matrix 110 of CNTs 112.

Not wishing to be bound by theory, in some embodiments the matrix 110 can be characterized as an electrically interconnected network of CNT exhibiting connectivity above a percolation threshold. Percolation threshold is a mathematical concept related to percolation theory, which is the formation of long-range connectivity in random systems. Below the threshold a so called "giant" connected component of the order of system size does not exist; while above it, there exists a giant component of the order of system size.

In some embodiments, the percolation threshold can be determined by increasing the mass fraction of CNTs 112 in the active layer 106 while measuring the conductivity of the layer, holding all other properties of the layer constant. In some such cases, the threshold can be identified with the mass fraction at which the conductivity of the layer sharply increases and/or the mass fraction above which the conductivity of the layer increases only slowly with increases with the addition of more CNTs. Such behavior is indicative of crossing the threshold required for the formation of interconnected CNT structures that provide conductive pathways with a length on the order of the size of the active layer 106.

Returning to FIG. 1, in some embodiments, one or both of the active layer 106 and the adhesion layer 104 may be treated by applying heat to remove impurities (e.g., functional groups of the CNTs, and impurities such as moisture, oxides, halides, or the like). For example, in some embodiments, one or both of the layers can be heated to at least 100° C., 150° C., 200° C., 250° C., 300° C., 350° C., 400° C., 450° C., 500° C., or more for at least 1 minute, 5 minutes, 10 minutes, 30 minutes, 1 hour, 2 hours, 3 hours, 12 hours, 24 hours, or more. For example, in some embodiments the layers may be treated to reduce moisture in the layer to less than 1,000 ppm, 500 ppm, 100 ppm, 10 ppm, 1 ppm, 0.1 ppm, or less.

Returning to FIG. 1, in some embodiments, the adhesion layer 104 may be formed of carbon nanotubes. For example, in some embodiments, the adhesion layer 104 may be at least about 50%, 75%, 80%, 90%, 95%, 96%, 97%, 98%, 99%, 99.5%, 99.9%, 99.99%, 99.999% by mass CNTs. In some embodiments, the CNTs may be grown directly on the conductive layer 102, e.g., using the chemical vapor deposition techniques such as those described in U.S. Patent Pub. No 20150210548 entitled "In-line Manufacture of Carbon Nanotubes" and published Jul. 30, 2015. In some embodiments, the CNTs may be transferred onto the conductive layer 102, e.g., using wet or dry transfer processes, e.g., of the type described e.g., in U.S. Patent Pub. No. 20150279578 entitled "High Power and high Energy Electrodes Using Carbon Nanotubes" and published Oct. 1, 2015. In some embodiments, the adhesion layer 104 adheres to the overlying active layer 106 using substantially only electrostatic forces (e.g., Van Der Waals attractions) between the CNTs of the adhesion layer 104 and the carbon material and CNTs of the active layer 106.

In some embodiments, the CNTs of the adhesion layer 104 may include single wall nanotubes (SWNT), double wall nanotubes (DWNT), or multiwall nanotubes (MWNT), or mixtures thereof. In some embodiments the CNTs may be vertically aligned. In one particular embodiment, the CNTs of the adhesion layer 104 may be primarily or entirely SWNTs and/or DWNTs, while the CNTs of the active layer 106 a primarily or entirely MWNTs. For example, in some embodiments, the CNTs of the of the adhesion layer 104 may be at least 75%, at least 90%, at least 95%, at least 99%, or more SWNT or at least 75%, at least 90%, at least 95%, at least 99%, or more DWNT. In some embodiments, the CNTs of the of the active layer 106 may be at least 75%, at least 90%, at least 95%, at least 99%, or more MWNT.

In some embodiments, the adhesion layer 104 may be formed by applying pressure to a layer of carbonaceous material. In some embodiments, this compression process alters the structure of the adhesion layer 104 in a way that promotes adhesion to the active layer 106. For example, in some embodiments pressure may be applied to layer comprising a vertically aligned array of CNT or aggregates of vertically aligned CNT, thereby deforming or breaking the CNTs.

In some embodiments, the adhesion layer may be formed by casting a wet slurry of CNTs (with or without additional carbons) mixed with a solvent onto the conductive layer 102. In various embodiments, similar techniques to those described above for the formation of the active layer 106 from a wet slurry may be used.

In some embodiments, mechanical energy may be introduced to the wet slurry using a sonicator (sometimes referred to as a sonifier) or other suitable mixing device (e.g., a high shear mixer). In some embodiments, the mechanical energy into the mixture per kilogram of mixture is at least 0.4 kWh/kg, 0.5 kWh/kg, 0.6 kWh/kg, 0.7 kWh/kg, 0.8 kWh/kg, 0.9 kWh/kg, 1.0 kWh/kg, or more. For example, the mechanical energy introduced into the mixture per kilogram of mixture may be in the range of 0.4 kWh/kg to 1.0 kWh/kg or any subrange thereof such as 0.4 kWh/kg to 0.6 kWh/kg.

In some embodiments, the solid carbon fraction of the wet slurry may be less than 10 wt %, 5 wt %, 4 wt %, 3 wt %, 2 wt %, 1 wt %, 0.5 wt %, 0.1 wt %, or less, e.g., in the range of 0.1 wt % to 10 wt % or any subrange thereof such as 0.1 wt % to 2 wt %.

In various embodiments, the conductive layer 102 may be made of a suitable electrically conductive material such as a metal foil (e.g., an aluminum foil). In some embodiments, the surface of the conductive layer 102 may be roughened, patterned, or otherwise texturized, e.g., to promote adhesion to the adhesion layer 104 and good electrical conductance from the active layer 106. For example, in some embodiments, the conductive layer may be etched (e.g., mechanically or chemically). In some embodiments, the conductive layer 102 may have a thickness in the range of 1 µm to 1,000 µm or any subrange thereof such as 5 µm to 50 µm.

In some embodiments, the conductive layer 102 may include a nanostructured surface. For example, as described in International Pub. No. WO 2016/057983 entitled "Nanostructured Electrode for Energy Storage Device" published Apr. 14, 2016, the conductive layer may have a top surface that includes nanoscale features such as whiskers (e.g., carbide whiskers) that promote adhesion to the adhesion layer 104 and good electrical conductance from the active layer 106. An exemplary current collector is the current collector available from Toyo Aluminum K.K. under the trade name TOYAL-CARBO®.

In some embodiments, one or both of the active layer 106 and the adhesion layer 104 may be treated by applying heat and/or vacuum to remove impurities (e.g., functional groups of the CNTs, and impurities such as moisture, oxides, halides, or the like).

In some embodiments, one or both of the active the active layer 106 and the adhesion layer 104 may be compressed, e.g., to break some of the constituent CNTs or other carbonaceous material to increase the surface area of the respective layer. In some embodiments, this compression treatment may increase one or more of adhesion between the layers, ion transport rate within the layers, and the surface area of the layers. In various embodiments, compression can be applied before or after the respective layer is applied to or formed on the electrode 100.

In some embodiments, the adhesion layer 104 may be omitted, such that the active layer 106 is disposed directly on the conductive layer 102.

Figure 3:
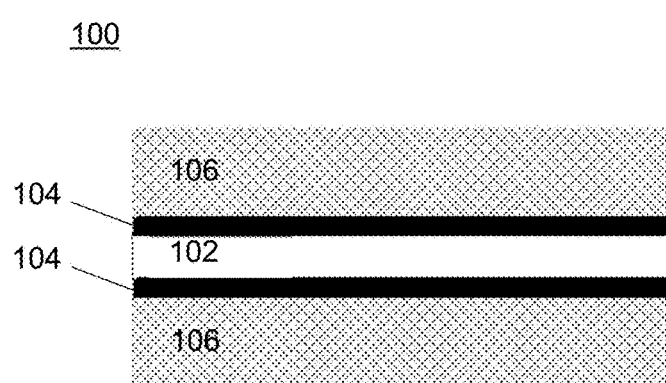
FIG. 3 is a schematic of a two-sided electrode.

Referring to FIG. 3, in some embodiments, the electrode 100 may be double sided, with an adhesion layer 104 and active layer 106 formed on each of two opposing major surfaces of the conductive layer 102. In some embodiments, the adhesion layer 104 may be omitted on one or both sides of the two-sided electrode 100.

Figure 4:
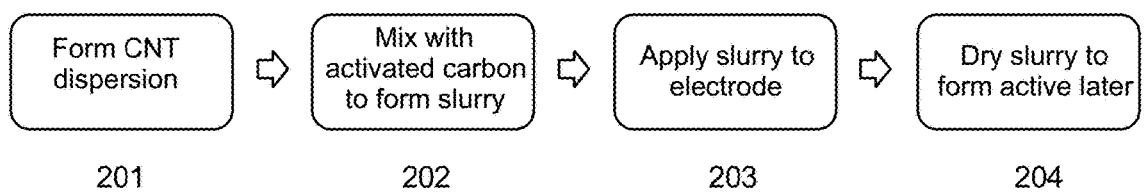
FIG. 4 is a flow chart illustrating a method of making an active layer for an electrode.

Referring to FIG. 4, an exemplary embodiment of method 200 of making the active layer 106 of electrode 100 is described. In step 201, CNTs are dispersed in a solvent to form a dispersion of CNTs. In some embodiments, the dispersion may be formed using any of the techniques described in U.S. Patent Pub. No. 20150279578 entitled "High Power and High Energy Electrodes Using Carbon Nanotubes" published Oct. 1, 2015 including stirring, sonication, or a combination of the two. In various embodiments, any suitable solvent may be used, including, for example, ethanol, methanol, isopropyl alcohol, dimethyl sulfoxide, dimethylformamide, acetone, acetonitrile, and the like. In general, it is advantageous to choose a solvent that will be substantially eliminated in the drying step 204 described below, e.g., using heat and/or vacuum drying techniques.

In some embodiments, the mixture of CNTs and solvents may be passed through a filter, e.g., an array of micro channels (e.g., having channels with diameters on the order of the radial size of the CNTs) to help physically separate the CNTs and promote dispersion.

In some embodiments, the CNT dispersion may be formed without the addition of surfactants, e.g., to avoid the presence of impurities derived from these surfactants at the completion of the method 200.

In step 202, the CNT dispersion is mixed with carbonaceous material (e.g., activated carbon) to form a slurry. In some embodiments, the slurry may be formed using any of the techniques described in U.S. Patent Pub. No. 20150279578, published on Oct. 1, 2015, including stirring, sonication, or a combination of the two. In some embodiments, the slurry may have solid carbon fraction of less than 20 wt %, 15 wt %, 10 wt %, 5 wt %, 2 wt %, 1 wt %, or less, e.g., in the range of 1 wt % to 20 wt % or any subrange thereof such as 4% to 6%. The mass ratio of CNTs to other carbonaceous material in the slurry may be less than 1:5, 1:10, 1:15, 1:20, 1:50, 1:100, or less, e.g., in the range of 1:10 to 1:20 or any subrange thereof.

In step 203, the slurry is applied to either the adhesion layer 104 or, if the adhesion layer 104 is omitted, the conductive layer 102 of the electrode 100. In some embodiments, the slurry may be formed into a sheet, and coated onto the electrode. For example, in some embodiments, slurry may be applied to through a slot die to control the thickness of the applied layer. In other embodiments, the slurry may be applied to the conductive layer 102, and then leveled to a desired thickness, e.g., using a doctor blade.

In some embodiments, the slurry may be compressed (e.g., using a calendaring apparatus) before or after being applied to the electrode 100. In some embodiments, the slurry may be partially or completely dried (e.g., by applying heat, vacuum or a combination thereof) during this step 203.

In step 204, if the slurry has not dried, or has been only partially dried during step 203, the slurry applied to the electrode is fully dried, (e.g., by applying heat, vacuum or a combination thereof). In some embodiments, substantially all of the solvent (and any other non-carbonaceous material such as dispersing agents) is removed from the active layer 106. In some embodiments, if impurities remain following the drying step, and additional step of heating (e.g. baking or annealing) the layer may be performed. For example, in some embodiments, one or both of the active the active layer 106 and the adhesion layer 104 may be treated by applying heat to remove impurities (e.g., functional groups of the CNTs, and impurities such as moisture, oxides, halides, or the like).

Figure 5:
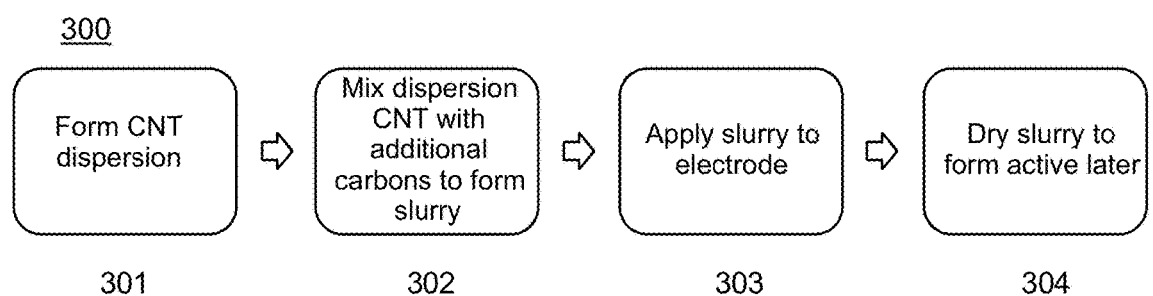
FIG. 5 is a flow chart illustrating a method of making an adhesion layer for an electrode.

Referring to FIG. 5, an exemplary embodiment of method 300 of making the adhesion layer 104 of electrode 100 is described. In step 301, CNTs are dispersed in a solvent to form a dispersion of CNTs. In some embodiments, the dispersion may be formed using any of the techniques described in U.S. Patent Pub. No. 20150279578, published on Oct. 1, 2015, including stirring, sonication, or a combination of the two. In various embodiments, any suitable solvent may be used, including, for example an organic solvent such as isopropyl alcohol, acetonitrile or propylene carbonate. In general, it is advantageous to choose a solvent that will be substantially eliminated in the drying step 304 described below.

In some embodiments, the mixture of CNTs and solvents may be passed through a filter, e.g., an array of micro channels (e.g., having channels with diameters on the order of the radial size of the CNTs) to help physically separate the CNTs and promote dispersion.

In some embodiments, the CNT dispersion may be formed without the addition of surfactants, e.g., to avoid the presence of impurities derived from these surfactants at the completion of the method 300.

In step 302, the CNT dispersion may optionally be mixed with additional carbonaceous material (e.g., activated carbon) to form a slurry. In some embodiments, the additional carbonaceous material may be omitted, such that the slurry is made up of CNTs dispersed in a solvent. In some embodiments, the slurry may have solid fraction of less than 5 wt %, 4 wt %, 3 wt %, 2 wt %, 1 wt %, 0.5 wt %, 0.1 wt %, or less, e.g., in the range of 0.1 to 5 wt % or any subrange thereof.

In step 303, the slurry is applied to the conductive layer 102 of the electrode 100. In some embodiments, the slurry may be coated onto the electrode. For example, in some embodiments, slurry may be applied to through a slot die to control the thickness of the applied layer. In other embodiments, the slurry may be applied to the conductive layer 102, and then leveled to a desired thickness, e.g., using a doctor blade.

In some embodiments, the slurry may be compressed (e.g., using a calendaring apparatus) before or after being applied to the electrode 100. In some embodiments, the slurry may be partially or completely dried (e.g., by applying heat, vacuum or a combination thereof) during this step 303.

In step 304, if the slurry has not dried, or has been only partially dried during step 203, the slurry applied to the electrode is fully dried (e.g., by applying heat, vacuum, or a combination thereof). In some embodiments, substantially all of the solvent (and any other non-carbonaceous material such as dispersing agents) is removed from the active layer 106. In some embodiments, if impurities remain following the drying step, and additional step of heating (e.g. baking or annealing) the layer may be performed. For example, in some embodiments, one or both of the active the active layer 106 and the adhesion layer 104 may be treated by applying heat to remove impurities (e.g., functional groups of the CNTs, and impurities such as moisture, oxides, halides, or the like).

In some embodiments, the method 300 for forming an adhesion layer 104 and method 200 for forming an active layer 106 may be performed in series to successively form the adhesion layer 104 followed by the overlaying active layer 106. In some embodiments, the foregoing methods may be repeated, e.g., to form a two-sided electrode of the type described herein.

Advantageously, in some embodiments, the method 300 for forming an adhesion layer 104 and/or method 200 for forming an active layer 106 may be implemented as a roll-to-roll processes (e.g., to allow volume production of electrode sheets several tens of meters long or more).

Figure 6:
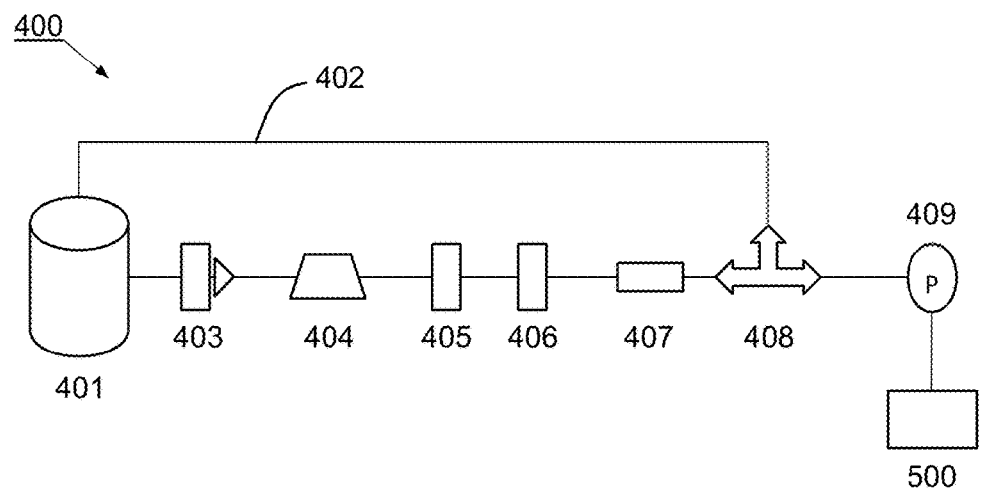
FIG. 6 is a schematic diagram of an exemplary mixing apparatus.

FIG. 6 shows an exemplary mixing apparatus 400 for implementing the method 300 for forming an adhesion layer 104 and/or method 200 for forming an active layer 106. In the interest of brevity, the apparatus 400 will be described for use in forming active layer 106 using method 200. However, as will be apparent to one skilled in the art, the apparatus 400 can easily be configured to implement the method 300 for forming an adhesion layer 104.

The apparatus 400 includes a mixing vessel 401. The mixing vessel receives a slurry composed of a solvent, carbon nanotubes, and (optionally) additional carbonaceous material of the type described above. In some embodiments, this slurry (or components thereof) may be initially formed in the mixing vessel 401. In other embodiments, the slurry may be formed elsewhere and then transferred to the mixing vessel 401.

In some embodiments the mixing vessel 401 may include one or more mechanisms for mixing the slurry, such as an impeller or high sheer mixer. In some embodiments, a mixing mechanism may be provided which is capable of stirring the slurry at a controlled rate, e.g., of up to 1000 rotations per minute (RPM) or more. In some embodiments, the mixing vessel may include one or more devices for applying mechanical energy to the slurry, such as a sonicator, mixer (e.g., a high shear mixer), homogenizer, or any other suitable device known in the art. In some embodiments, the mixing vessel may be temperature controlled, e.g., using one or more heating and/or cooling elements such as electric heaters, tubing for circulating chilled water, or any other such devices known in the art.

Slurry from the mixing vessel 401 may be circulated through a flow line 402, e.g. a pipe or tubing, using a pump 403. Pump 403 may be any suitable configuration, such as a peristaltic pump. A flow meter 404 may be provided to measure the rate of slurry flow through the flow line 402. A filter 405 may be provided to filter the slurry flowing through the flow line 402, e.g., to remove clumps of solid material having a size above a desired threshold.

In some embodiments, e.g., where mixing vessel 401 does not include a sonicator, an in-line sonicator 406 may be provided to sonicate slurry flowing through the flow line 402. For example, in some embodiments a flow through sonicator such as the Branson Digital SFX-450 sonicator available commercially from Thomas Scientific of 1654 High Hill Road Swedesboro, N.J. 08085 U.S.A. may be used.

In some embodiments, a temperature control device 407, such as a heat exchanger arranged in a sleeve disposed about the flow line 402, is provided to control the temperature of the slurry flowing through the flow line 402.

In some embodiments a valve 408 is provided which can be selectively controlled to direct a first portion of the slurry flowing through flow line 402 to be recirculated back to the mixing vessel 401, while a second portion is output externally, e.g., to a coating apparatus 500. In some embodiments, a sensor 409 such as a pressure sensor or flow rate sensor is provided to sense one or more aspects of the output portion of slurry.

In various embodiments any or all of the elements of apparatus 400 may be operatively connected to one or more computing devices to provide for automatic monitoring and/or control of the mixing apparatus 400. For example, the sonicator 406 may include digital controls for controlling its operating parameters such as power and duty cycle.

Figure 7A:
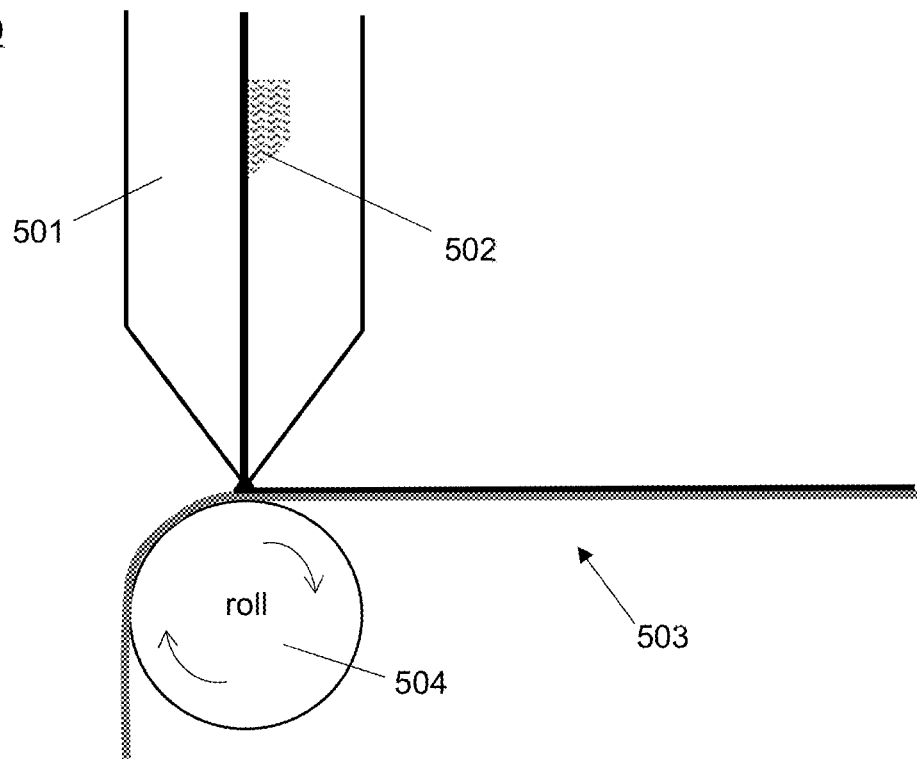
FIG. 7A is a schematic diagram of coating apparatus featuring a slot die.

In various embodiments, the coating apparatus 500 may be any suitable type known in the art. For example, FIG. 7A shows an exemplary embodiment of coating apparatus 500 featuring a slot die 501 that distributes slurry received from a source such as the mixing apparatus 400 through a distribution channel 502 onto a substrate 503 (e.g., the conductive layer 102, either bare or already coated with adhesion layer 104) which moves across a roller 504. Setting the height of the slot die above the substrate 503 on the roller 504 and controlling the flow rate and/or pressure of the slurry in the channel 502 allows for control of the thickness and density of the applied coating. In some embodiments, channel 502 may include one or more reservoirs to help ensure consistent flow of slurry to provide uniform coating during operation.

Figure 7B:
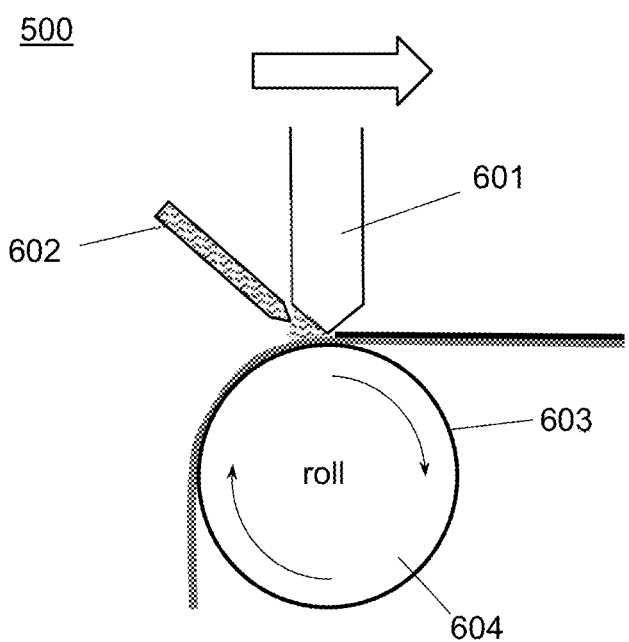
FIG. 7B is a schematic diagram of coating apparatus featuring a doctor blade.

FIG. 7B shows an exemplary embodiment of coating apparatus 500 featuring a doctor blade 601 that levels slurry received from a source such as the mixing apparatus 400 that is applied through on or more applicators 602 (one is shown) onto a substrate 603 (e.g., the conductive layer 102, either bare or already coated with adhesion layer 104) which moves across a roller 604. The direction of travel of the substrate 603 is indicated by the heavy dark arrow. Setting the height of the doctor blade 601 above the substrate 603 on the roller 604 and controlling the flow rate and/or pressure of the slurry through the applicator 602 allows for control of the thickness and density of the applied coating. Although a single doctor blade 601 is shown, multiple blades may be used, e.g., a first blade to set a rough thickness of the coating, and a second blade positioned down line form the first blade to provide fine smoothing of the coating.

Further, disclosed herein are capacitors incorporating the electrode that provide users with improved performance in a wide range of temperatures. Such ultracapacitors may comprise an energy storage cell and an electrolyte system within an hermetically sealed housing, the cell electrically coupled to a positive contact and a negative contact, wherein the ultracapacitor is configured to operate at a temperatures within a temperature range between about −100 degrees Celsius to about 300 degrees Celsius or more, or any subrange thereof, e.g., −40° C. to 200° C., −40° C. to 250° C., −40° C. to 300° C., 0° C. to 200° C., 0° C. to 250° C., 0° C. to 300° C. In some embodiments such ultracapacitors can operate at voltages of 1.0 V, 2.0 V, 3.0 V, 3.2 V, 3.5 V, 4.0 V, or more, e.g., for lifetimes exceeding 1,000 hours.

Figure 8A:
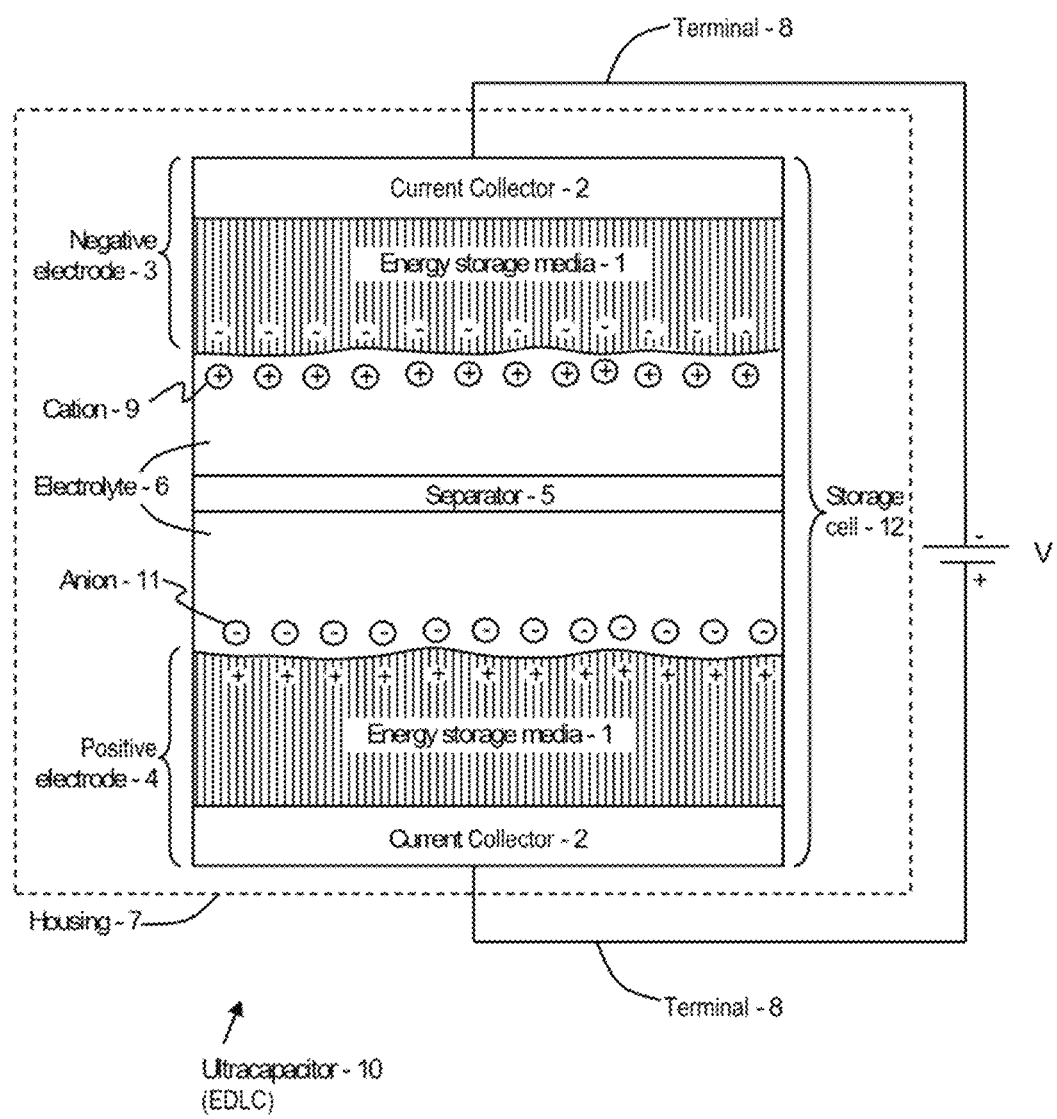
FIG. 8A is a schematic of an ultracapacitor.
Figure 8B:
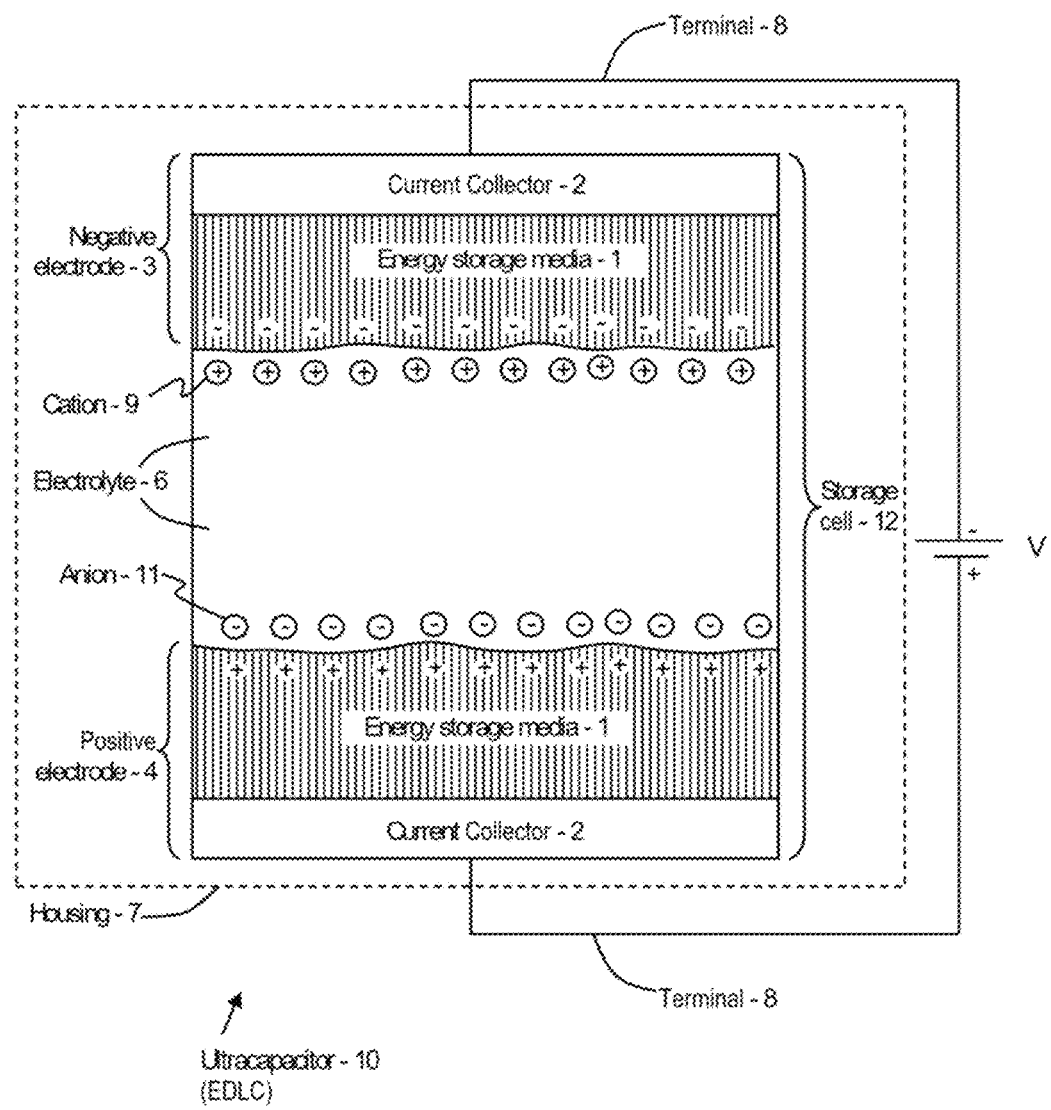
FIG. 8B is a schematic of an ultracapacitor without a separator.

As shown in FIGS. 8A and 8B, exemplary embodiments of a capacitor are shown. In each case, the capacitor is an "ultracapacitor 10." The difference between FIG. 8A and FIG. 8B is the inclusion of a separator in exemplary ultracapacitor 10 of FIG. 8A. The concepts disclosed herein generally apply equally to any exemplary ultracapacitor 10. Certain electrolytes of certain embodiments are uniquely suited to constructing an exemplary ultracapacitor 10 without a separator. Unless otherwise noted, the discussion herein applies equally to any ultracapacitor 10, with or without a separator.

The exemplary ultracapacitor 10 is an electric double-layer capacitor (EDLC). The EDLC includes at least one pair of electrodes 3 (where the electrodes 3 may be referred to as a negative electrode 3 and a positive electrode 3, merely for purposes of referencing herein). When assembled into the ultracapacitor 10, each of the electrodes 3 (which may each be an electrode 100 of the type shown in FIG. 1 above) presents a double layer of charge at an electrolyte interface. In some embodiments, a plurality of electrodes 3 is included (for example, in some embodiments, at least two pairs of electrodes 3 are included). However, for purposes of discussion, only one pair of electrodes 3 are shown. As a matter of convention herein, at least one of the electrodes 3 uses a carbon-based energy storage media 1 (e.g., the active layer 106 of electrode 100 shown in FIG. 1), and it assumed that each of the electrodes includes the carbon-based energy storage media 1. It should be noted that an electrolytic capacitor differs from an ultracapacitor because metallic electrodes differ greatly (at least an order of magnitude) in surface area.

Each of the electrodes 3 includes a respective current collector 2 (also referred to as a "charge collector"), which may be the conductive layer 102 of electrode 100 shown in FIG. 1. In some embodiments, the electrodes 3 are separated by a separator 5. In general, the separator 5 is a thin structural material (usually a sheet) used to separate the negative electrode 3 from the positive electrode 3. The separator 5 may also serve to separate pairs of the electrodes 3. Once assembled, the electrodes 3 and the separator 5 provide a storage cell 12. Note that, in some embodiments, the carbon-based energy storage media 1 may not be included on one or both of the electrodes 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

At least one form of electrolyte 6 is included in the ultracapacitor 10. The electrolyte 6 fills void spaces in and between the electrodes 3 and the separator 5. In general, the electrolyte 6 is a substance that disassociates into electrically charged ions. A solvent that dissolves the substance may be included in some embodiments of the electrolyte 6, as appropriate. The electrolyte 6 conducts electricity by ionic transport.

In some embodiments, the electrolyte 6 may be in gelled or solid form (e.g., an ionic liquid impregnated polymer layer). Examples of such electrolytes are provided in International Publication No. WO 2015/102716 entitled "ADVANCED ELECTROLYTES FOR HIGH TEMPERATURE ENERGY STORAGE DEVICE" and published Jul. 9, 2015.

In other embodiments, the electrolyte 6 may be in non-aqueous liquid form, e.g., an ionic liquid, e.g., of a type suitable for high temperature applications. Examples of such electrolytes are provided in International Publication No. WO 2015/102716 entitled "ADVANCED ELECTROLYTES FOR HIGH TEMPERATURE ENERGY STORAGE DEVICE" and published Jul. 9, 2015.

In some embodiments, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

As discussed herein, "hermetic" refers to a seal whose quality (i.e., leak rate) is defined in units of "atm-cc/second," which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec. Generally, the ultracapacitor 10 disclosed herein is capable of providing a hermetic seal that has a leak rate no greater than about $5.0 \times 10^{-6}$ atm-cc/sec, and may exhibit a leak rate no higher than about $5.0 \times 10^{-10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non-destructive method. In one example of this technique, the ultracapacitor 10 is placed into an environment of helium. The ultracapacitor 10 is subjected to pressurized helium. The ultracapacitor 10 is then placed into a vacuum chamber that is connected to a detector capable of monitoring helium presence (such as an atomic absorption unit). With knowledge of pressurization time, pressure and internal volume, the leak rate of the ultracapacitor 10 may be determined.

In some embodiments, at least one lead (which may also be referred to herein as a "tab") is electrically coupled to a respective one of the current collectors 2. A plurality of the leads (accordingly to a polarity of the ultracapacitor 10) may be grouped together and coupled to into a respective terminal 8. In turn, the terminal 8 may be coupled to an electrical access, referred to as a "contact" (e.g., one of the housing 7 and an external electrode (also referred to herein for convention as a "feed-through" or "pin")). Suitable exemplary designs are provided in International Publication No. WO 2015/102716 entitled "ADVANCED ELECTROLYTES FOR HIGH TEMPERATURE ENERGY STORAGE DEVICE" and published Jul. 9, 2015.

Various forms of the ultracapacitor 10 may be joined together. The various forms may be joined using known techniques, such as welding contacts together, by use of at least one mechanical connector, by placing contacts in electrical contact with each other and the like. A plurality of the ultracapacitors 10 may be electrically connected in at least one of a parallel and a series fashion.

Figure 9:
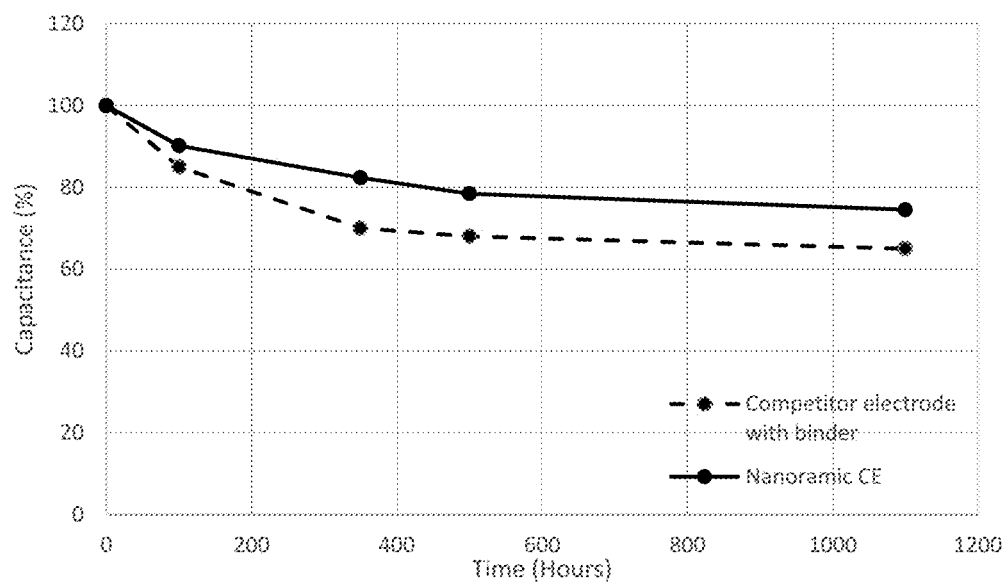
FIG. 9 is a plot of capacitance as a function of time, depicting performance of capacitors comprising electrodes fabricated according to certain embodiments compared to a capacitor comprising a competitor electrode.
Figure 10:
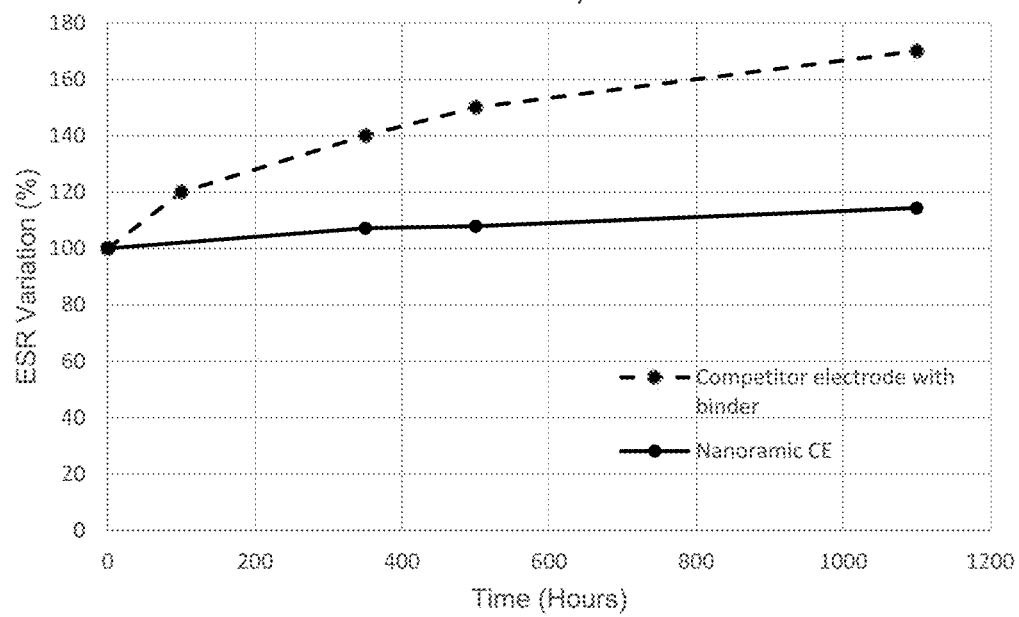
FIG. 10 is a plot of ESR Variation as a function of time, depicting performance of capacitors comprising electrodes fabricated according to certain embodiments compared to a capacitor comprising a competitor electrode.

FIGS. 9 and 10 depict aspects of performance as measured in a reliability test for an electrolytic double layer capacitor (EDLC) in accordance with certain embodiments. The test was performed at 2.3 volts, 85 degrees Celsius, using a CAN electrolyte lead-type system. As shown in the capacitance comparison (FIG. 9) and the ESR comparison (FIG. 10), capacitance of the embodiment labeled as "Nanoramic CE" showed improved performance. The ESR was 50% less when Nanoramic CE is used instead of conventional electrode materials.

Figure 11:
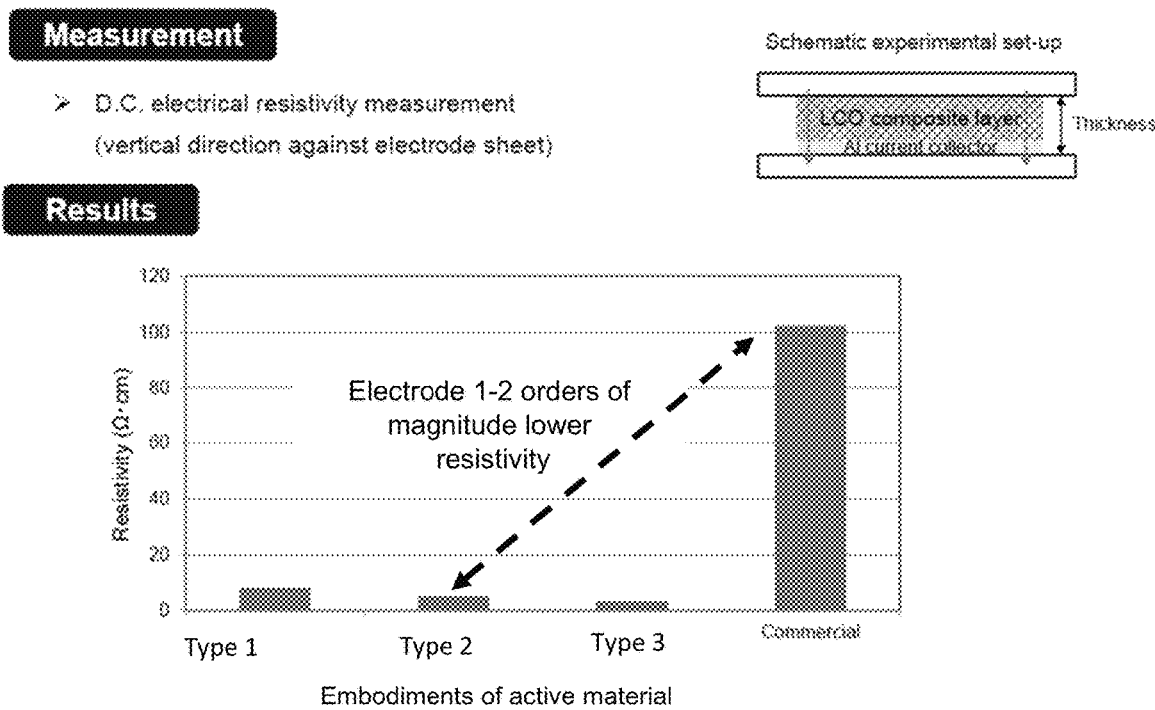
FIG. 11 is a graphic depicting resistivity performance of capacitors comprising electrodes fabricated according to certain embodiments compared to a capacitor comprising a competitor electrode.

FIG. 11 depicts resistivity measurements for equivalent configurations of electrodes fabricated with different electrode materials. Electrodes fabricated with electrode materials provided according to certain embodiments disclosed herein are "labeled" as Type 1, Type 2, and Type 3. A comparator electrode is labeled as "Commercial." It may be seen that the ESR of the commercial electrodes is substantially higher than that of the electrodes fabricated in accordance with certain embodiments disclosed herein.

Figure 12:
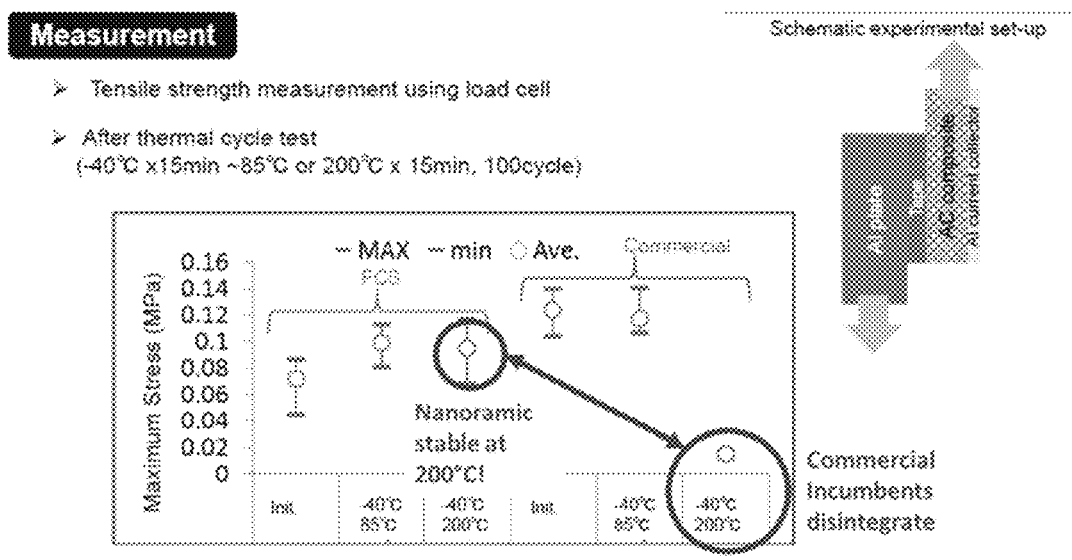
FIG. 12 is a graphic depicting tensile strength performance of capacitors comprising electrodes fabricated according to certain embodiments compared to a capacitor comprising a competitor electrode.

Further, as shown in FIG. 12, the performance of electrodes fabricated in accordance with certain embodiments disclosed herein when under stress is substantially improved over that of comparators. In this example, the electrodes in accordance with certain embodiments disclosed herein are capable of continued operation with stress influence that is about an order of magnitude superior to comparator electrodes. Performance under stress has many real-world implications. For example, industrial environments such as aerospace and geophysical exploration demand energy storage systems that can withstand high levels of vibrational and gravitational stress. More specifically, certain embodiments disclosed herein provide for high strength energy storage systems that can withstand stress from rocket launches, drilling, and other such endeavors where competitive devices would simply fall apart.

As used herein the symbol "wt %" means weight percent. For example, when referring to the weight percent of a solute in a solvent, "wt %" refers to the percentage of the overall mass of the solute and solvent mixture made up by the solute.

The entire contents of each of the publications and patent applications mentioned above are incorporated herein by reference. In the event that the any of the cited documents conflicts with the present disclosure, the present disclosure shall control.

Various other components may be included and called upon for providing for aspects of the teachings herein. For example, additional materials, combinations of materials, and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party.

The appended claims or claim elements should not be construed to invoke 35 U.S.C. § 112(f) unless the words "means for" or "step for" are explicitly used in the particular claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood that various changes may be made and equivalents may be substituted for elements thereof without departing from the scope of the invention. For example, in some embodiments, one of the foregoing layers may include a plurality of layers there within. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
    an active layer substantially free of binding agents, the active layer comprising:
    a network of carbon nanotubes defining void spaces, the network of carbon nanotubes making up less than 10% by weight of the active layer; where the carbon nanotubes are vertically aligned; and
    a carbonaceous material located in the void spaces and bound by the network of carbon nanotubes;
    wherein the active layer is configured to provide energy storage.

2. The apparatus of claim 1, wherein the active layer consists essentially of the carbonaceous material and the carbon nanotubes.

3. The apparatus of claim 1, wherein the active layer is bound together by electrostatic forces between the carbon nanotubes and the carbonaceous material.

4. The apparatus of claim 1, wherein the carbonaceous material comprises activated carbon.

5. The apparatus of claim 1, wherein the carbonaceous material comprises nanoform carbon other than carbon nanotubes.

6. The apparatus of claim 1, wherein the network of carbon nanotubes makes up less than 5% by weight of the active layer.

7. The apparatus of claim 1, wherein the network of carbon nanotubes makes up less than 1% by weight of the active layer.

8. The apparatus of claim 1, further comprising an adhesion layer consisting essentially of carbon nanotubes disposed between the active layer and an electrically conductive layer.

9. The apparatus of claim 8, wherein a surface of the electrically conductive layer facing the adhesion layer comprises a roughened or textured portion.

10. The apparatus of claim 8, wherein a surface of the electrically conductive layer facing the adhesion layer comprises a nanostructured portion.

11. The apparatus of claim 10, wherein the nanostructured portion comprises carbide nanowhiskers.

12. The apparatus of claim 1, wherein the active layer has been annealed to reduce the presence of impurities.

13. The apparatus of claim 1, wherein the active layer has been compressed to deform at least a portion of the network of carbon nanotubes and the carbonaceous material.

14. The apparatus of claim 1, further comprising an electrode comprising the active layer.

15. The apparatus of claim 14, further wherein the electrode is a two-sided electrode comprising a second active layer.

16. The apparatus of claim 14, further comprising an ultracapacitor comprising the electrode.

17. The apparatus of claim 16, wherein the ultracapacitor has an operating voltage greater than 3.0 V.

18. The apparatus of claim 16, wherein the ultracapacitor has an operating voltage greater than 3.2 V.

19. The apparatus of claim 16, wherein the ultracapacitor has an operating voltage greater than 3.5 V.

20. The apparatus of claim 16, wherein the ultracapacitor has an operating voltage greater than 4.0 V.

21. The apparatus of claim 16, wherein the ultracapacitor has a maximum operating temperature of at least 250° C. at an operating voltage of at least iV for a lifetime of at least 1,000 hours.

22. The apparatus of claim 16, wherein the ultracapacitor has a maximum operating temperature of at least 250° C. at an operating voltage of at least 2V for a lifetime of at least 1,000 hours.

23. The apparatus of claim 16, wherein the ultracapacitor has a maximum operating temperature of at least 250° C. at an operating voltage of at least 3V for a lifetime of at least 1,000 hours.

24. The apparatus of claim 16, wherein the ultracapacitor has a maximum operating temperature of at least 250° C. at an operating voltage of at least 4V for a lifetime of at least 1,000 hours.

25. The apparatus of claim 16, wherein the ultracapacitor has a maximum operating temperature of at least 300° C. at an operating voltage of at least 1V for a lifetime of at least 1,000 hours.

26. The apparatus of claim 16, wherein the ultracapacitor has a maximum operating temperature of at least 300° C. at an operating voltage of at least 2V for a lifetime of at least 1,000 hours.

27. The apparatus of claim 16, wherein the ultracapacitor has a maximum operating temperature of at least 300° C. at an operating voltage of at least 3V for a lifetime of at least 1,000 hours.

28. The apparatus of claim 16, wherein the ultracapacitor has a maximum operating temperature of at least 300° C. at an operating voltage of at least 4V for a lifetime of at least 1,000 hours.

29. A method comprising
dispersing carbon nanotubes in a solvent to form a dispersion;
mixing the dispersion with carbonaceous material to form a slurry,
applying the slurry in a layer; and
vertically aligning the carbon nanotubes in the slurry;
drying the slurry to substantially remove the solvent to form an active layer that is substantially free of binder material, the active layer comprising a network of carbon nanotubes making up less than 10% by weight of the active layer, the carbon nanotubes defining void spaces and the carbonaceous material is located in the void spaces and bound by the network of carbon nanotubes.

30. The method of claim 29, further comprising forming and/or applying a layer of carbon nanotubes to provide an adhesion layer on a conductive layer.

31. The method of claim 30, wherein the applying step comprises applying the slurry onto the adhesion layer.

* * * * *